(12) United States Patent
Sugiyama

(10) Patent No.: US 7,747,979 B2
(45) Date of Patent: Jun. 29, 2010

(54) COOPERATION INSTRUCTION INFORMATION CREATION DEVICE AND COOPERATION INSTRUCTION INFORMATION CREATION METHOD FOR DOCUMENT SERVICES ON A NETWORK

(75) Inventor: Takaaki Sugiyama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1106 days.

(21) Appl. No.: 10/661,504

(22) Filed: Sep. 15, 2003

(65) Prior Publication Data

US 2004/0199399 A1  Oct. 7, 2004

(30) Foreign Application Priority Data

Mar. 20, 2003 (JP) ............................. 2003-078974

(51) Int. Cl.
*G06F 9/44* (2006.01)
*G06F 15/16* (2006.01)
*G06F 15/173* (2006.01)

(52) U.S. Cl. ........................ 717/100; 709/201; 709/223

(58) Field of Classification Search ......... 717/100–103, 717/106, 109; 709/203, 223
See application file for complete search history.

(56) References Cited

U.S. PATENT DOCUMENTS

| | | | | |
|---|---|---|---|---|
| 5,481,601 A | * | 1/1996 | Nazif et al. ............. | 379/201.03 |
| 5,887,171 A | * | 3/1999 | Tada et al. .................... | 719/317 |
| 5,907,607 A | * | 5/1999 | Waters et al. ........... | 379/201.03 |
| 5,978,583 A | * | 11/1999 | Ekanadham et al. ........ | 717/106 |
| 6,038,563 A | * | 3/2000 | Bapat et al. ................... | 707/10 |
| 6,092,088 A | * | 7/2000 | Takeda ........................ | 715/234 |
| 6,173,437 B1 | * | 1/2001 | Polcyn ........................ | 717/100 |
| 6,363,411 B1 | * | 3/2002 | Dugan et al. ................ | 709/202 |
| 6,430,538 B1 | * | 8/2002 | Bacon et al. .................... | 705/9 |
| 6,477,563 B1 | * | 11/2002 | Kawamura et al. .......... | 709/202 |
| 6,594,355 B1 | * | 7/2003 | Deo et al. .................... | 379/219 |
| 6,662,207 B2 | * | 12/2003 | Kawamura et al. .......... | 709/202 |
| 6,697,784 B2 | * | 2/2004 | Bacon et al. ................... | 705/9 |
| 6,728,947 B1 | * | 4/2004 | Bengston .................... | 717/103 |
| 6,799,314 B2 | * | 9/2004 | Beniyama et al. ........... | 717/100 |

(Continued)

FOREIGN PATENT DOCUMENTS

JP            9-30057            2/1997

(Continued)

*Primary Examiner*—Wei Y Zhen
*Assistant Examiner*—Qing Chen
(74) *Attorney, Agent, or Firm*—Oliff & Berridge, PLC.

(57) ABSTRACT

Even if there exists use restriction in each of devices on a network, cooperation instruction information is created to enable execution of a cooperative processing. A script creation server performs user authentication of a client terminal and acquires user information. Next, the script creation server makes a retrieval request to a service retrieval server for services which the user can use at present, and transmits user information, and then, acquires a service list. When judging that a service is selected as one of structural elements of a job flow, the script creation server causes the user information to reflect the cost and the like required to perform the selected service. Then, the script creation server judges whether the job flow is completed, and creates a script on the basis of information relating to the job flow and inputted function information when it is judged that the job flow is completed.

6 Claims, 20 Drawing Sheets

U.S. PATENT DOCUMENTS

| | | | |
|---|---|---|---|
| 6,851,115 B1 * | 2/2005 | Cheyer et al. | 719/317 |
| 6,892,228 B1 * | 5/2005 | Penders | 709/219 |
| 6,895,573 B2 * | 5/2005 | Norgaard et al. | 717/100 |
| 2002/0052796 A1 * | 5/2002 | Tadokoro et al. | 705/26 |

FOREIGN PATENT DOCUMENTS

| | | |
|---|---|---|
| JP | 9-120241 | 5/1997 |
| JP | 10-161823 | 6/1998 |
| JP | 2001-328317 | 11/2001 |

* cited by examiner

FIG. 7

| SERVICE CLASS |
| --- |
| SERVICE NAME |
| SERVICE ICON |
| SERVICE INFORMATION LOCATION |
| INPUT |
| OUTPUT |
| PARAMETER RESTRICTION RULES |
| SERVICE LOCATION |
| METHOD NAME |
| INVOCATION SCHEME |
| IMPLICIT ELEMENTS |
| FLOW<br>(INVOCATION, MAP, METHOD)<br>(CONTROL STRUCTURE, LOGICAL OPERATION) |

FIG. 8

| RESTRICTION VALUE TABLE ||
|---|---|
| 1 | SERVICE EXECUTION MONEY |
| 2 | SERVICE EXECUTION TIME |
| 3 | NECESSARY AUTHORITY |
| 4 | NUMBER OF EXECUTABLE TIMES/PERSON |
| 5 | DISTANCE TO USER |
| ⋮ | ⋮ |

FIG. 10

| USER INFORMATION | |
|---|---|
| 1 | FUNDS |
| 2 | DESIRED DUE DATE |
| 3 | USER ACCOUNT |
| 4 | NUMBER OF USER EXECUTION TIMES |
| 5 | WHEREABOUTS |
| ⋮ | ⋮ |

COOPERATION INSTRUCTION INFORMATION CREATION DEVICE AND COOPERATION INSTRUCTION INFORMATION CREATION METHOD FOR DOCUMENT SERVICES ON A NETWORK

BACKGROUND OF THE INVENTION

1. Field of the Invention

The present invention relates to a cooperation instruction information creation device and a cooperation instruction information creation method, and particularly to a cooperation instruction information creation device and a cooperation instruction information creation method in which even in a case where use restriction of a user exists in respective devices, cooperation instruction information not subjected to the use restriction is created.

2. Description of the Related Art

In a dispersion processing system in which plural services for performing specific processings on document data exist through a network, users can use desired services from various places.

However, in the case where all users can use all services, there is a case where only a certain specific service is intensively used, and there is a problem that an excessive load is applied to the specific service. Besides, in the case where all users can use all services, there is also a problem that user differentiation, that is, that a predetermined service is provided to only a user having specific authority, can not be realized.

On the other hand, JP-A-9-30057 discloses a printing system in which the watching and management of the use situation of a printer device, and use restriction are performed for each user. JP-A-9-120241 discloses a printing device and a printing control method in which an identifier of a user is stored in a toner cartridge so that the user of the toner cartridge and the number of print sheets for each user are restricted.

Besides, JP-A-10-161823 discloses a printing system in which the number of print sheets for each user is restricted, usable print functions are restricted, and the use situation of a shared printer is managed by an administrator. JP-A-2001-328317 discloses a printer device in which when the number of recording sheets used is restricted for each user, the number of sheets is efficiently restricted for each of many users.

The technique disclosed in any of the patent documents described above is for independently restricting the output of print for each user. When printers having the technique as stated above are connected to a network and a cooperative processing of services is executed, there is a problem that a partial service can not be executed, and the cooperative processing of services can not be smoothly performed.

SUMMARY OF THE INVENTION

The present invention has been made to solve the foregoing problems, and provides a cooperation instruction information creation device and a cooperation instruction information creation method in which even in a case where use restriction of a user exists in each of devices on a network, cooperation instruction information such as enables smooth execution of a cooperative processing is created.

A cooperation instruction information creation device of the invention is a cooperation instruction information creation device for creating cooperation instruction information to instruct cooperation of plural services, each performing a specific processing on document data, on a network, and includes a service acquisition unit for acquiring plural services available to a user by using user information, and a cooperation instruction information creation unit for creating cooperation instruction information by using the plural services acquired by the service acquisition unit.

The service acquisition unit acquires the plural services available to the user by using the user information. The user information expresses the present state of the user at the time when a service is executed, and is updated each time the service is executed as the need arises. The service acquisition unit may acquire the plural services available to the user through a retrieval unit for retrieving services. The service acquisition unit may acquire the plural services available to the user by directly inquiring of respective service processing devices. Besides, in the case where a job flow making plural functions cooperate with each other is already created, the service acquisition unit may acquire a service available to the user for each of functions constituting the job flow, or may acquire a service which has the least restriction among them. Then, the cooperation instruction information creation unit uses the plural services acquired by the service acquisition unit to create the cooperation instruction information.

Accordingly, according to the cooperation instruction information creation device of the invention, the plural services available to the user are acquired by using the user information, and the cooperation instruction information is created by using the acquired plural services, so that the cooperation instruction information for smoothly executing the cooperative processing of the plural services can be created without being subjected to service restriction.

A cooperation instruction information creation method of the invention is a cooperation instruction information creation method for creating cooperation instruction information to instruct cooperation of plural services, each performing a specific processing on document data, on a network, and includes a service acquisition step of acquiring plural services available to a user by checking respective restriction value tables expressing execution restriction of the respective services against user information, and a cooperation instruction information creation step of creating cooperation instruction information by using the plural services acquired at the service acquisition step.

At the service acquisition step, the respective restriction value tables expressing the execution restriction of the respective services are checked against the user information. At this time, at the service acquisition step, the respective restriction value tables may be checked against the user information through the retrieval unit for retrieving services, or the check may be performed by directly inquiring of respective service processing devices previously storing the restriction value tables. By this, the plural services available to the user are acquired at the service acquisition step. At the cooperation instruction information creation step, the cooperation instruction information is created by using the plural services acquired at the service acquisition step.

Accordingly, according to the cooperation instruction information creation method of the invention, the plural services available to the user are acquired by checking the respective restriction value tables expressing the execution restriction of the respective services against the user information, and the cooperation instruction information is created by using the plural acquired services, so that the cooperation instruction information for smoothly executing the cooperative processing of the plural services can be created without being subjected to service restriction.

BRIEF DESCRIPTION OF THE DRAWINGS

Preferred embodiments of the present invention will be described in detail based on the following figures, wherein:

FIG. 7 is a conceptual view showing a script constructed in an XML format;

FIG. 8 is a view showing the structure of a restriction value table;

FIG. 10 is a view showing the structure of user information;

DETAILED DESCRIPTION OF THE INVENTION

Hereinafter, preferred embodiments of the invention will be described in detail with reference to the drawings.

First Embodiment

System Configuration

Figure 1:
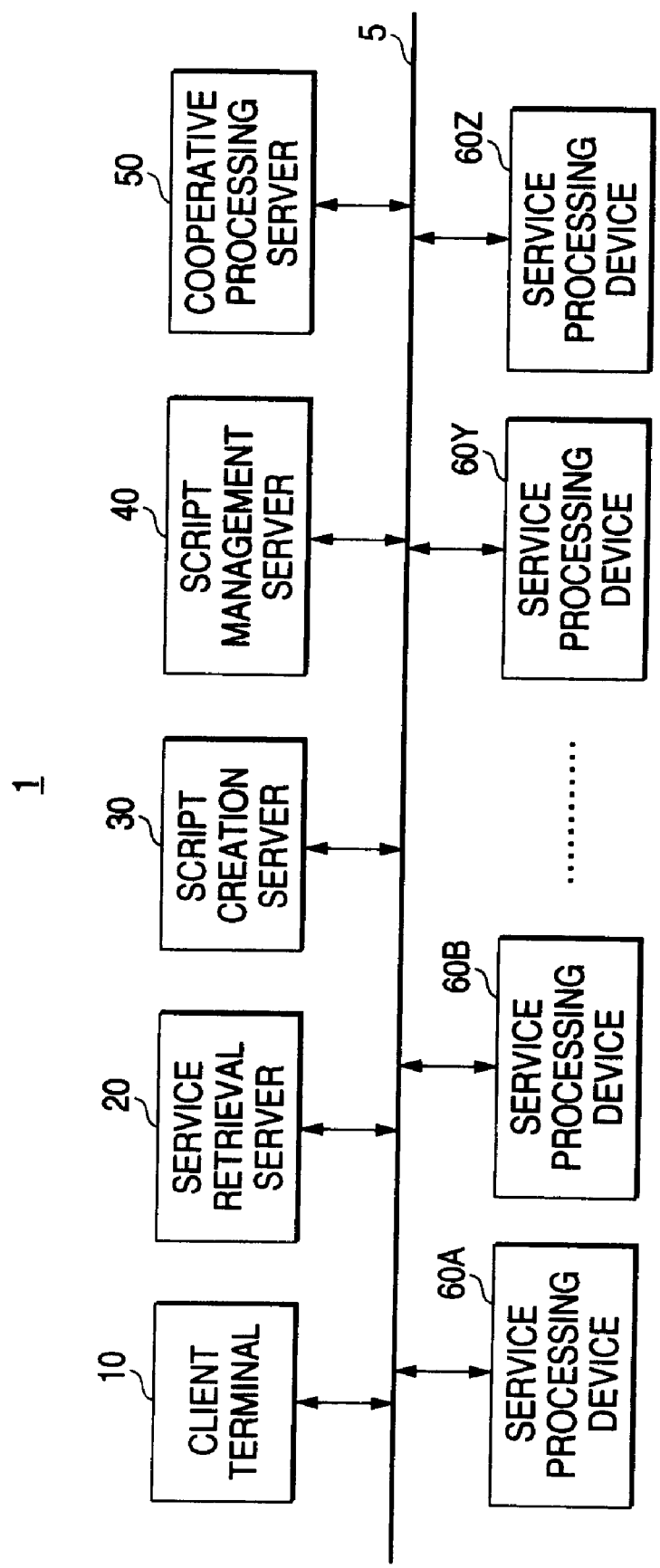
FIG. 1 is a block diagram showing the configuration of a document processing system according to a first embodiment of the invention.

FIG. 1 is a block diagram showing the configuration of a document processing system 1 according to a first embodiment of the invention.

In the document processing system 1, various services and applications are connected through a network 5. Here, the service is a function usable on a document in accordance with a request from the outside. The service is equivalent to, for example, copy, print, scan, facsimile transmission and reception, mail delivery, storing into a repository (or database) and readout from the repository, OCR (Optical Character Recognition) processing, noise removal processing, PDF conversion and the like, and is not particularly limited.

The document processing system 1 specifically includes a client terminal 10 provided with a user interface for making plural services cooperate with each other to instruct a desired processing of a user, a service retrieval server 20 for retrieving a desired service of the user, a script creation server 30 for creating a script from information relating to the service cooperation instructed by the client terminal 10, a script management server 40 for managing the script, and a cooperative processing server 50 for performing a cooperative processing of the respective services in accordance with the script.

Further, the document processing system 1 includes a service processing device 60A for performing a service A, a service processing device 60B for performing a service B, . . . , a service processing device 60Y for performing a service Y, and a service processing device 60Z for performing a service Z. Hereinafter, when any one of the service processing devices 60A, 60B, . . . , 60Y and 60Z is indicated, it will be expressed as a service processing device 60.

Incidentally, although the document processing system 1 in the embodiment has the configuration in which the plural servers for performing the specific services are connected through the network 5, as long as the plural services are connected through the network 5, the configuration is not particularly limited.

Here, the script is data containing, in a case where a series of processings are decomposed into plural functional processings, information expressing a relation among the respective functions, interface (I/F) information for invoking the respective functions, and information for constructing a graphical user interface (GUI) relating to the series of processings.

Figure 2:
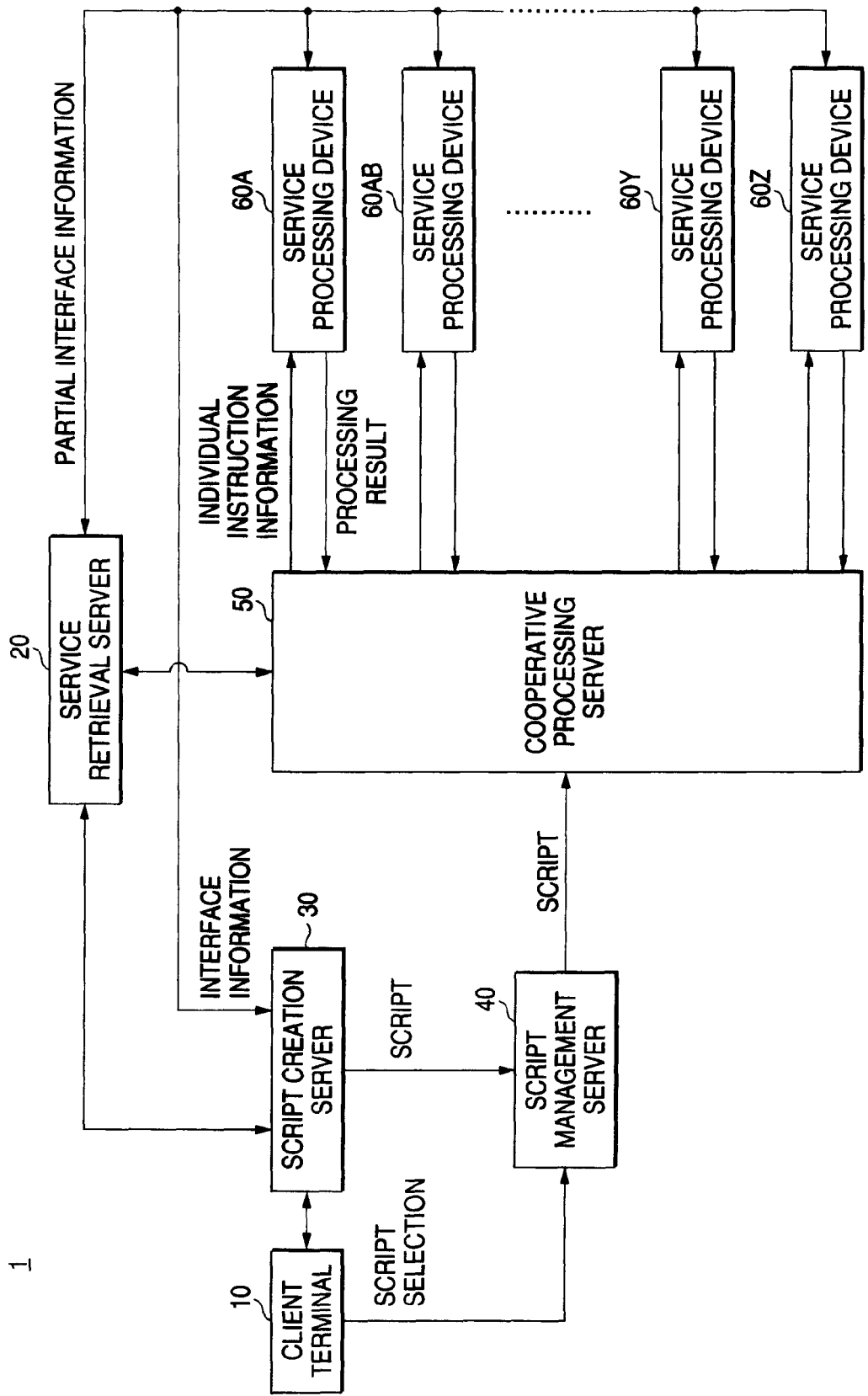
FIG. 2 is a block diagram for explaining the mutual relation of respective service processing devices constituting the document processing system.

FIG. 2 is a block diagram for explaining the mutual relation of the respective service processing devices constituting the document processing system 1. Each of the service processing devices stores I/F information expressing the contents of the service provided by itself.

Figure 3:
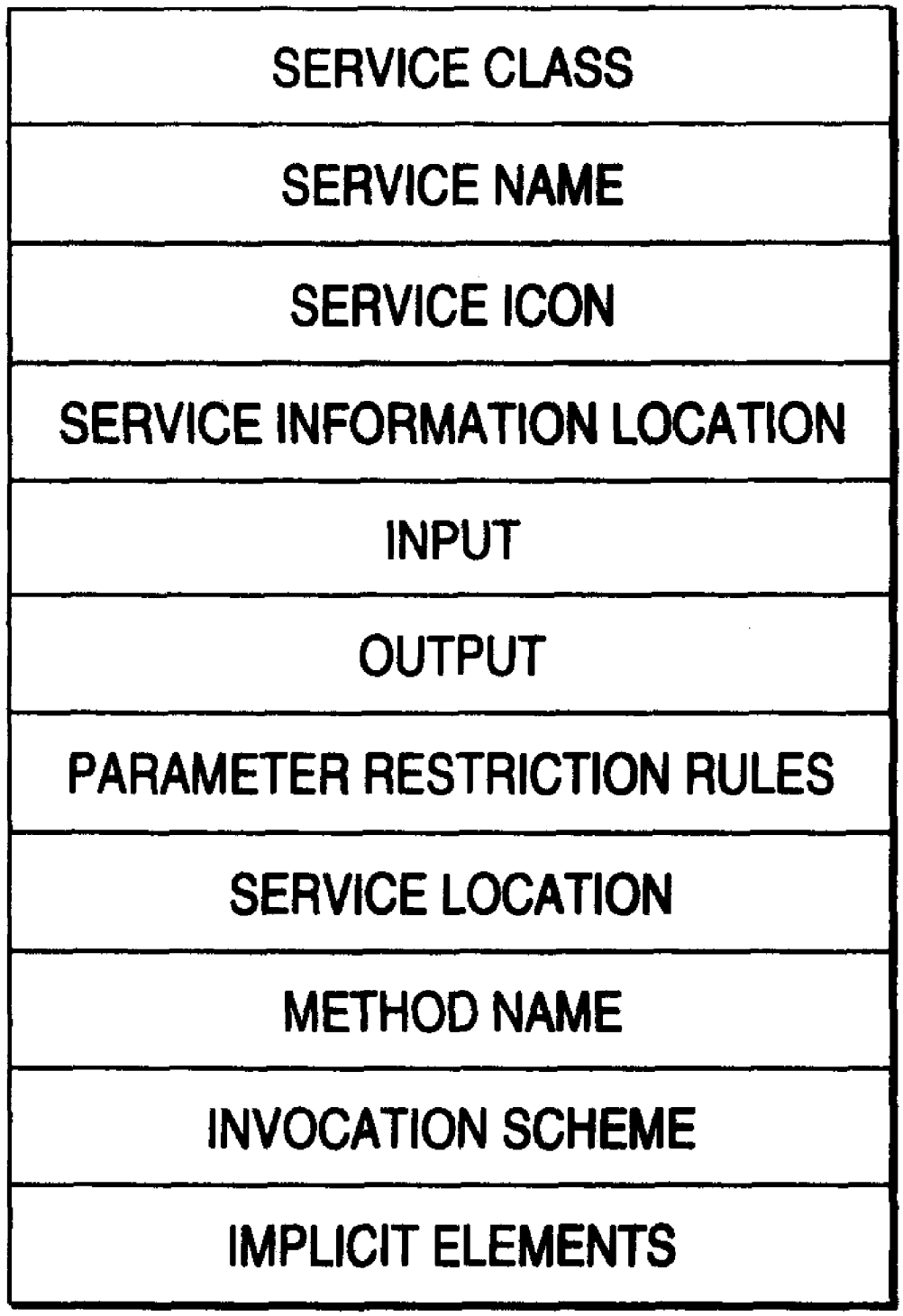
FIG. 3 is a view showing the structure of I/F information.

FIG. 3 is a view showing the structure of the I/F information. The I/F information is constituted by <Service Class>, <Service Name>, <Service Icon>, <Service Location Information>, <Input>, <Output>, <Parameter Restriction Rules>, <Service Location>, <Method Name>, <Invocation Scheme>, and <Implicit Elements>.

The <Service Class> is a class of a service provided by the service processing device. Incidentally, what is previously defined is used as the <Service Class> and is equivalent to, for example, scan, print, repository, flow and the like. The <Service Name> is a name of a service provided by the service processing device. The <Service Icon> is position information of an icon displayed on the GUI of the client terminal 10.

The <Service Location Information> is a URL which the script creation server 30 uses for acquiring the I/F information. The <Input> is an input to the service. The <Output> is an output from the service. The <Parameter Restriction Rules> are restriction rules applied to the <Input> and the <Output>. The <Service Location> is position information when the service is actually used. In the <Method Name>, a providing method of a service processing and a name expressing the service are described.

The <Invocation Scheme> is a scheme for invoking and starting a service. Incidentally, as the <Invocation Scheme>, for example, SOAP (Simple Object Access Protocol) as the protocol of message exchange, SMTP (Simple Mail Transfer Protocol), and the like can be used. The <Implicit Elements> are not data which are explicitly delivered as output to a later stage processing, however, they are data which can be consulted at the later stage processing.

The client terminal 10 has the function of a graphical user interface (GUI) for performing a specific operation, for example, for instructing the creation of a script or for performing a screen display in order to select the script to be invoked.

The service retrieval server 20 retrieves a service corresponding to a retrieval condition from plural services connected to the network 5. The service retrieval server 20 previously stores part of the I/F information (hereinafter referred to as "partial I/F information") of the various service processing devices 60. Here, the partial I/F information is <Service Class>, <Service Name>, <Service Location Information>, <Input> information, and <Output> information in the elements of the I/F information.

When the retrieval condition is transmitted from the script creation server 30 or the cooperative processing server 50, the service retrieval server 20 uses the partial I/F information of the respective service processing devices to retrieve the service. For example, when a service similar to a specific service is retrieved, the service retrieval server 20 may retrieve services which are coincident to each other in the <Service Class>, or may retrieve services which are coincident to each other in the <Input> and <Output>, or may retrieve services which are coincident to each other in all of these.

Figure 4:
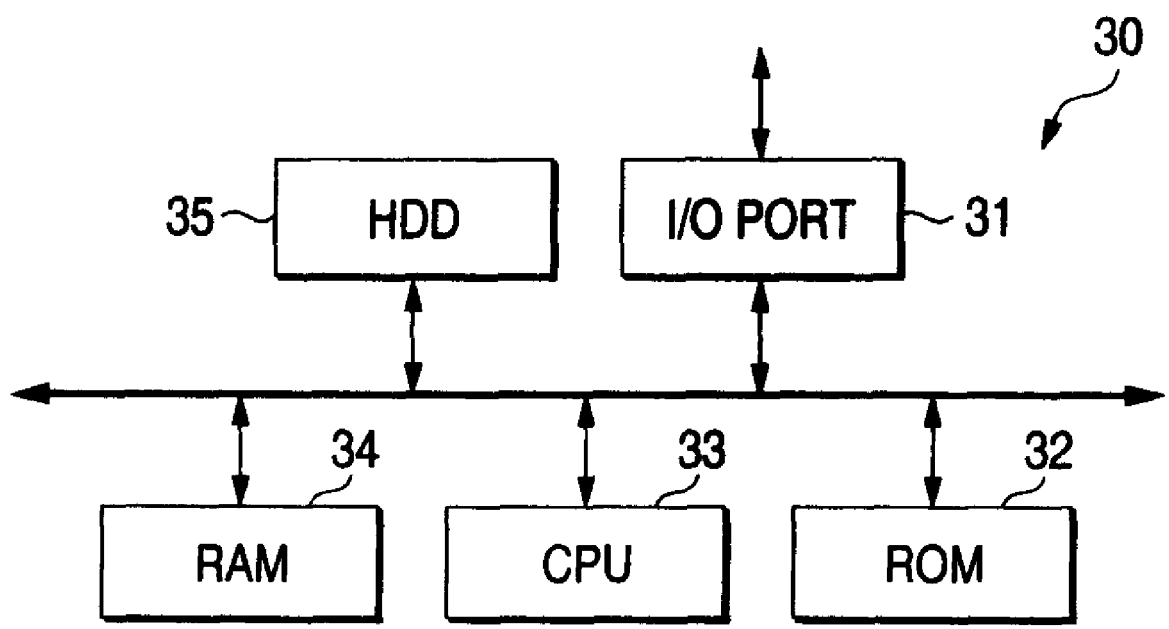
FIG. 4 is a block diagram showing the configuration of a script creation server.

FIG. 4 is a block diagram showing the configuration of the script creation server 30. The script creation server 30 includes an input/output port 31 for transmitting/receiving information to/from the network 5, a ROM 32 storing a script creation control program, a CPU 33 for executing a total processing including script creation, a RAM 34 as a work area of data, and a hard disk drive 35 for storing data processed by the CPU 33.

The input/output port 31 receives, for example, user information, a service list and I/F information, and transmits a retrieval request signal and a script. The CPU 33 controls the total processing of the script creation server 30, and instructs, for example, the creation of a script, a retrieval request to the service retrieval server 20, and an inquiry to the service processing device 60.

Figure 5:
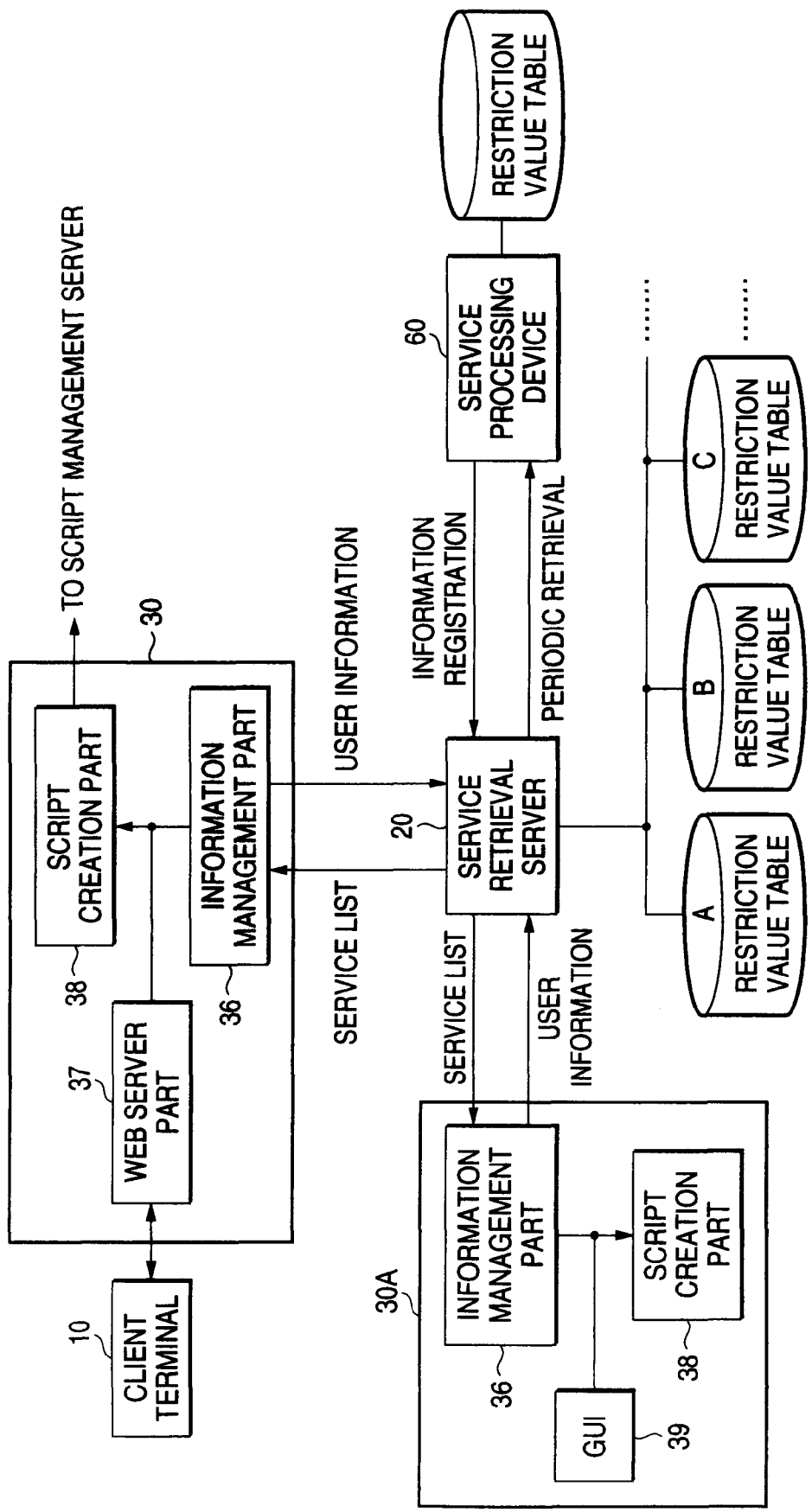
FIG. 5 is a view for explaining the mutual relation among a client terminal, a service retrieval server, a script creation server and a service processing device.

FIG. 5 is a view for explaining the mutual relation among the client terminal 10, the service retrieval server 20, the script creation server 30 and the service processing device 60.

The script creation server 30 is functionally configured as shown in FIG. 5, and includes an information management part 36 for managing various pieces of information such as I/F information, a Web server part 37 for transmitting/receiving information to/from the client terminal 10, and a script creation part 38 for creating a script on the basis of information obtained by the information management part 36 and the Web server part 37.

Incidentally, the script creation server 30 may use not only WebUI but also client application. That is, a script creation server 30A provided with an information management part 36, a script creation part 38 and a graphical user interface (GUI) 39 may be used instead of the script creation server 30.

On the basis of the <Service Location Information>, the information management part 36 requests a specific service processing device dispersed on the network 5 to transmit the I/F information relating to each service and the restriction value table. Incidentally, in the case where a desired service processing device is not grasped, the information management part 36 instructs the service retrieval server 20 to retrieve another service processing device for performing the same service as the desired service processing device. Then, the information management part 36 has only to obtain the <Service Location Information> of another service processing device from the service retrieval server 20. Then, the information management part 36 manages the retrieval result from the service retrieval server 20, and the I/F information and the restriction value tables received from the respective service processing devices.

The Web server part 37 creates, for example, an HTML file, which becomes a GUI screen for defining a job flow, on the basis of the I/F information acquired from the respective service processing devices. When a service browse request is issued from the client terminal 10, the Web server part 37 transmits the HTML file, which becomes the GUI screen, to the client terminal 10.

Figure 6:
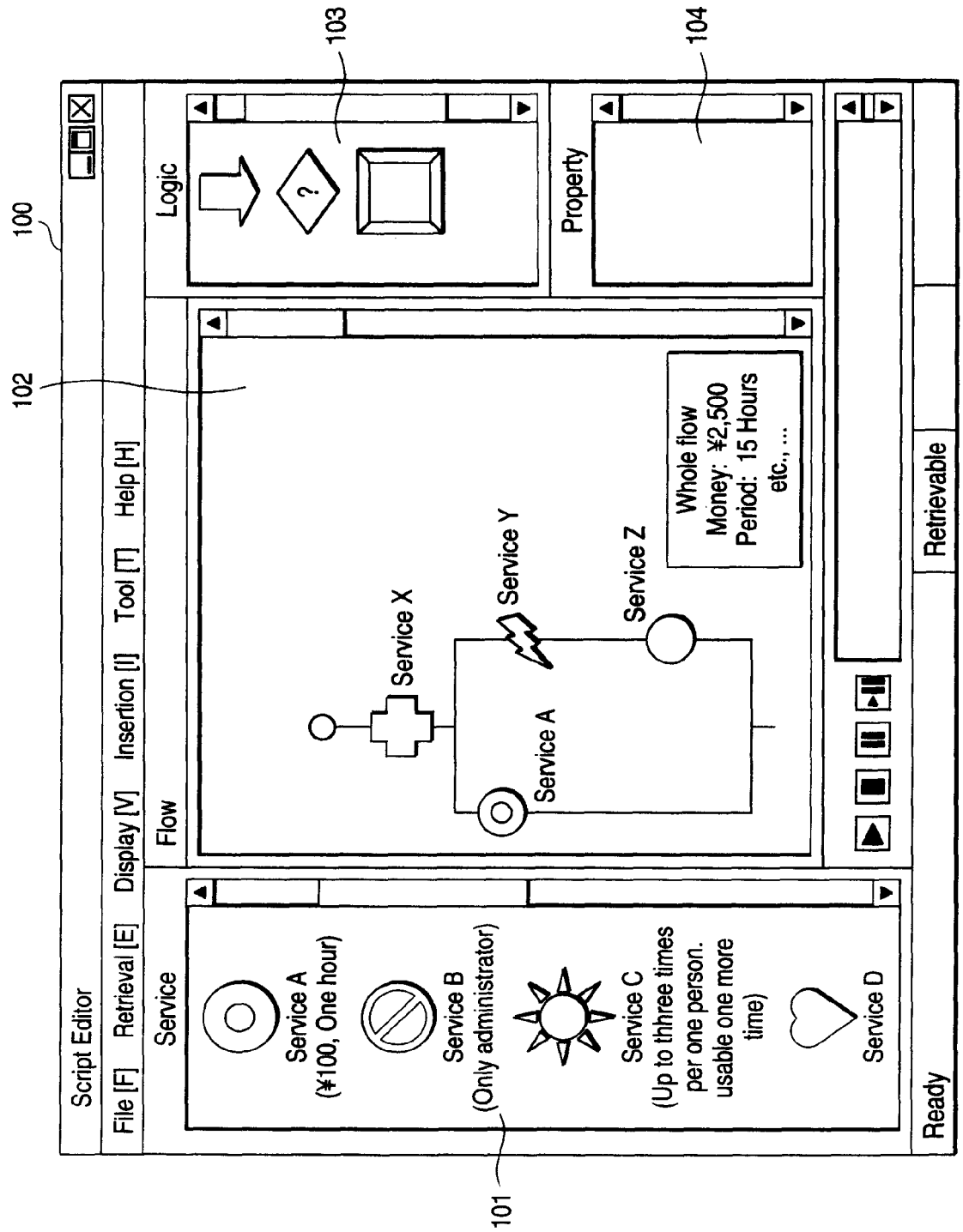
FIG. 6 is a view showing a script creation screen as a GUI screen created by a Web server part.

FIG. 6 is a view showing a script creation screen 100 as the GUI screen created by the Web server part 37. The script creation screen 100 is constituted by a service window 101, a flow window 102, a logic window 103, and a property window 104.

The service window 101 displays various usable services (service processing devices 60) by respective icons. The logic window 103 displays a job flow indicating a pattern of cooperation of services. The property window 104 displays detailed setting parameters of the respective icons displayed on the service window 101 and the logic window 103.

The user can define the job flow on the flow window 102 by dragging and dropping the icons of the service window 101 and the icons of the logic window 103 to the flow window 102. The user further edits the contents displayed on the property window 104 and can fully set the relation among the services, logics and the like. The client terminal 10 transmits the job flow information defined by the operation of the user to the script creation server 30.

On the basis of the job flow information relating to the instruction of the service cooperation from the user and the I/F information of the respective services, the script creation part 38 of the script creation server 30 creates a script defining the contents of processings requested to the respective services, input parameters, the way (job flow) of cooperation of the respective services, and information for specifying a document as a processing object, such as a document name and storage location information. The script is composed of a file of the XML format.

FIG. 7 is a conceptual view showing the script. Incidentally, this script may be described in the form of the XML format. Since the cooperative processing itself of the plural services is also regarded as one service, the script has the structure in which <Flow> is added to the I/F information shown in FIG. 3.

The <Flow> is an element for describing the cooperation between the services and includes <Invoke>, control structure and logic operation, an element, such as <if>, for performing a condition judgment, an operation instruction of an XML structure for adjusting the cooperation between the services, and information for specifying a document as a processing object.

The <Invocation> expresses a specific method of a service processing device, and executes invocation of a service. The element of the <Invocation> includes <Map> expressing the position information of a parameter, and <Method> of a method name to be invoked. The <if>, <and>, <eq> and <gt> expressing the control structure, the logic operation and the like carry out condition branching at the time of the cooperative processing and adjustment of parameters delivered between the services.

The script describes all information relating to the control of the cooperative processing of the services in the element of the <Flow>. By this, the cooperative processing itself expressed by the script is also regarded as one service. Incidentally, the script is not limited to the structure shown in FIG. 5, and it is sufficient if the respective services can cooperate with each other.

The script creation server 30 transmits the script of the XML format as stated above to the script management server 40. Besides, in the case where the execution of the service cooperative processing is instructed by the user, the script creation server 30 may directly transmit the script to the cooperative processing server 50.

The script management server 40 holds the script transmitted from the script creation server 30, and transmits the script to the cooperative processing server 50 in accordance with the request from the client terminal 10.

The cooperative processing server 50 is a server for interpreting and executing the specified script. When the script is transmitted, the cooperative processing server 50 interprets the script, sequentially invokes the service processing devices 60 in accordance with the order and the use method described in the script, and executes the cooperative processing. Besides, the cooperative processing server 50 stores the situation of the cooperative processing under execution and the information of the result of the completed cooperative processing, and notifies the situation of the cooperative processing and the result in accordance with a request from the outside.

The cooperative processing server 50 interprets the script, and when making a request to the respective service processing devices, the cooperative processing server creates individual instruction information having the contents of the processing request, input parameters and information for specifying the document as the processing object. Incidentally, the cooperative processing server 50 may extract information relating to a service processing in the cooperative processing before or after a processing performed by each of the service processing devices to describe it in the script, or may make a processing request in an information exchange format intrinsic to each of the service processing devices, not in the format of the script.

The service processing device 60A is a device for performing a specific service relating to a document in accordance with an instruction from the outside. Here, the service processing device 60A executes a service to be executed by itself on the basis of the information such as the contents of the processing request from the cooperative processing server 50, input parameters, and information for specifying the document as the processing object. Besides, the service processing device 60A notifies the service retrieval server 20 of the partial I/F information at the time of invocation. Further, the service processing device 60A transmits the I/F information indicating the use method of the service in accordance with the request from the script creation server 30.

The service processing device 60A stores a restriction value table for restricting the use of a user. The restriction value table is user restriction information previously set by a service provider.

FIG. 8 is a view showing the structure of the restriction value table. The restriction value table expresses restrictions and conditions for executing a service according to a user. The restriction value table includes "service execution money" indicating the money required for the execution of this service, "service execution time" indicating a time taken to execute this service, "necessary authority" indicating a user account having authority necessary to execute this service, "number of executable times/person" indicating the number of times one person can execute this service, and "distance to user" indicating a distance between the service processing device 60A and the user. Incidentally, the restriction value table is not restricted to the case where all the pieces of information are included, but may include arbitrary partial information or may further include additional information.

The service processing devices 60B, ..., 60Y and 60Z are respectively configured to perform a processing similarly to the service processing device 60A except for the contents of the service.

In the document processing system 1 configured as described above, when an application program for executing a specific service is installed, the service processing device 60 operates as follows.

The service processing device 60 notifies the service retrieval server 20 of the partial I/F information containing the summary of its service and information expressing its address, and the restriction value table at the invocation processing.

The service retrieval server 20 stores the partial I/F information and the restriction value tables transmitted from the respective service processing devices. By this, when a specific service retrieval request is issued from, for example, the script creation server 30 or the cooperative processing server 50, the service retrieval server 20 can perform retrieval by using the partial I/F information and the restriction value tables.

(Script Creation 1)

Figure 9:
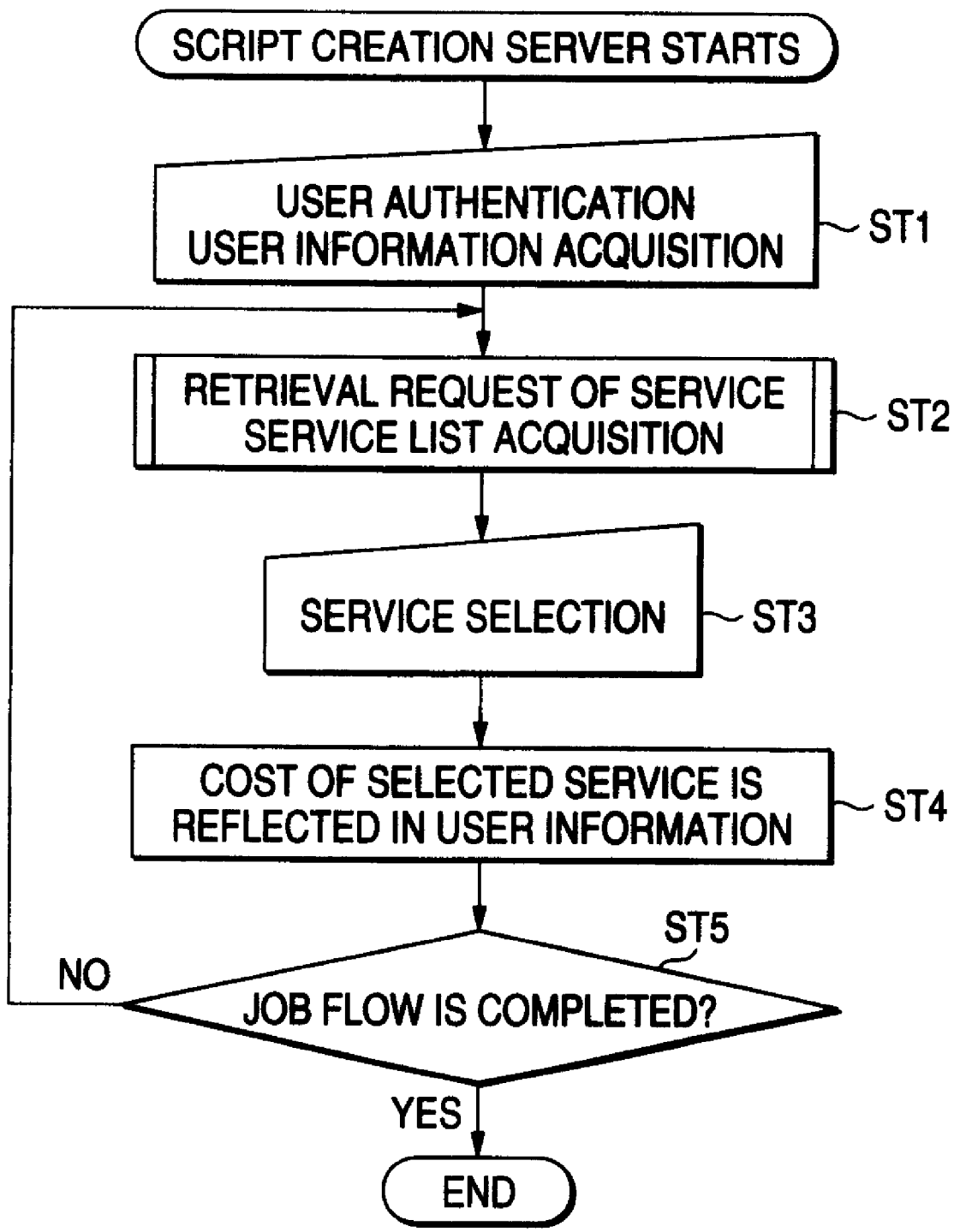
FIG. 9 is a flowchart showing the processing procedure of a script creation server at the time of script creation.

FIG. 9 is a flowchart showing a processing procedure of the script creation server 30 at the time of creation of a script. In this embodiment, the service retrieval server 20 manages the restriction value tables of the respective service processing devices 60 in a unified way. Then, after causing the service retrieval server 20 to execute the retrieval of services, the script creation server 30 creates the script.

At first, the client terminal 10 accesses a URL (Uniform Resource Locator) of an HTML file created for a user interface screen provided by the script creation server 30 through an installed browser in accordance with the operation of the user. When confirming the access of the client terminal 10, the script creation server 30 carries out processings subsequent to step ST1.

At the step ST1, the script creation server 30 performs user authentication of the client terminal 10. Then, the script creation server acquires user information inputted by the user to the client terminal 10 and proceeds to step ST2.

FIG. 10 is a view showing the structure of the user information. The user information includes, as information expressing the user himself/herself, "funds" of the user, "desired due date", "user account", "number of user execution times" indicating the number of times the user executes each of services, and "whereabouts" of the user. The user information is not limited to the case where all the pieces of information are included, but may include arbitrary partial information or may further include addition information.

Although described later in detail, the service retrieval server 20 uses the user information as shown in FIG. 10 when investigating whether the user's use of the service processing device 60 is restricted.

At the step ST2, the script creation server 30 makes a retrieval request to the service retrieval server 20 for services which the user can use at present and transmits the user information. Thereafter, when acquiring the service list from the service retrieval server 20, the script creation server 30 proceeds to step ST3.

(Service Retrieval)

Figure 11:
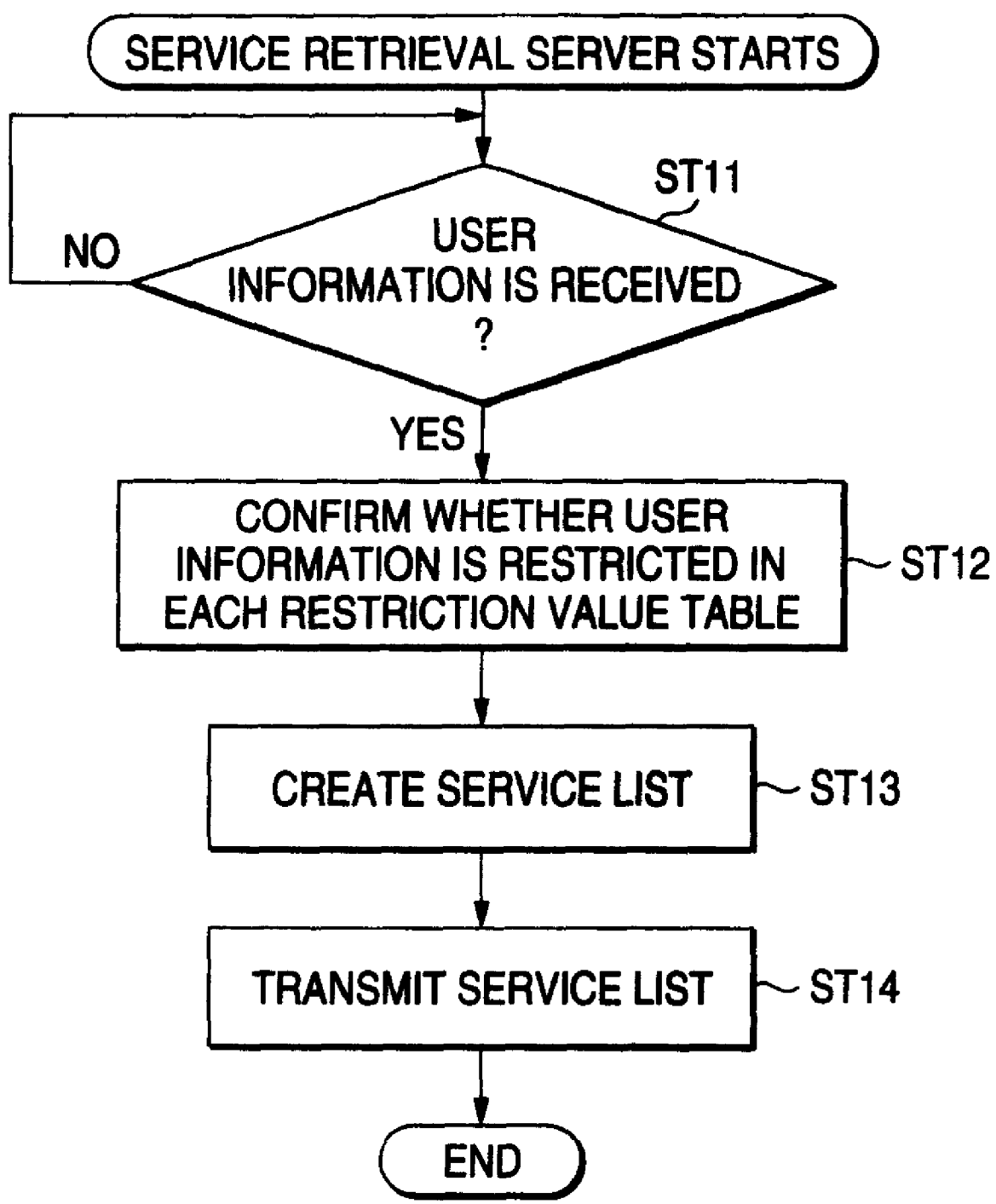
FIG. 11 is a flowchart for explaining the retrieval processing procedure of a service retrieval server.

FIG. 11 is a flowchart for explaining a retrieval processing procedure of the service retrieval server 20. When receiving the service retrieval request from the script creation server 30, the service retrieval server 20 executes processings subsequent to step ST11.

At the step ST11, the service retrieval server 20 judges whether the user information is received, and stands by until the user information is received, and when receiving the user information, the service retrieval server proceeds to step ST12.

At the step ST12, the service retrieval server 20 compares the user information with the restriction value tables of the respective service processing devices 60, confirms whether the user information is restricted by the respective restriction value tables, and proceeds to step ST13.

For example, when "funds" of the user information is "service execution money" of the restriction value table or higher, the service retrieval server 20 judges that "there is no restriction", and when lower than that, it is judged that "there is restriction". Besides, when "service execution time" of the restriction value table is within "desired due date" of the user information, it is judged that "there is no restriction", and if not so, it is judged that "there is restriction".

As stated above, in order to retrieve a service (service processing device 60) in which the user's use is not restricted, the service retrieval server 20 checks the respective items of the user information against the respective items of the restriction value table, and judges that "there is restriction" when the restriction exists even in one item, and judges that "there is no restriction" when the restriction does not exist in all the items. Incidentally, the service retrieval server 20 may check only partial items, for example, only items having high priority.

At step ST13 and step ST14, the service retrieval server 20 creates a service list expressing the service processing devices 60 corresponding to the restriction value tables of "there is no restriction". Incidentally, the service list also includes <Service Location Information> for accessing the respective service processing devices 60. Then, the service retrieval server 20 transmits this service list to the script creation server 30, and ends the retrieval processing. On the other hand, when receiving the service list from the service retrieval server 20, the script creation server 30 proceeds to step ST3 shown in FIG. 9.

(Script Creation 2)

At the step ST3, the script creation server 30 transmits the script creation screen 100 (for example, HTML file) for creating the script by using the respective services described in the service list to the client terminal 10.

The client terminal 10 displays the script creation screen 100 on the basis of information constituting the screen and contained in, for example, the HTML file transmitted from the script creation server 30. At this time, the user uses the script creation screen 100 shown in FIG. 6 and can define the job flow of a desired service cooperation.

For example, as shown in FIG. 6, services A, B, C and D which the user can use at present, and their restriction contents are displayed on the service window 101 of the script creation screen 100. For example, the service A can be executed for one hour at 100 yen, the service B can be executed by only an administrator, the service C can be executed up to three times per person, and this user can use it one more time. Incidentally, there is no particular restriction in the service D.

The script creation server 30 judges whether a certain service is selected as one of structural elements of the job flow through the client terminal 10, and when judging that it is selected, the script creation server proceeds to step ST4.

At the step ST4, the script creation server 30 causes the user information to reflect the cost required for the service selected by the client terminal 10, and proceeds to step ST5. For example, the script creation server 30 subtracts "service execution money" of the service selected at the step ST3 from "funds" of the user information, or increments "number of user execution times" to update the user information. Incidentally, when the selection at the step ST3 is cancelled, the script creation server 30 restores the user information to the original state.

When the service is selected, the script creation server 30 transmits information relating to the whole job flow and the updated user information to the client terminal 10. By this, for example, as shown in FIG. 6, the restriction information of the whole flow, for example, the cost ("money: ¥2,500" in FIG. 6) required to execute the whole job flow at the present stage and the period ("period: 15 hours" in FIG. 6) are displayed on the flow window 102 of the script creation screen 100. Incidentally, the updated user information may be further displayed on the script creation screen 100.

At step ST5, the script creation server 30 judges whether the job flow is completed. For example, when the instruction of the job flow creation end is issued by the client terminal 10, it is judged that the job flow is completed, and when the instruction is not issued, it is judged that the job flow is not completed. When the job flow is not completed, the processings subsequent to the step ST2 are again executed.

As stated above, the script creation server 30 executes the processings from the step ST2 to the step ST5 repeatedly, so that the script creation server sequentially updates the user information, retrieves the service available under the present user information, and can create the script from the retrieved services.

When judging that the job flow is completed, the script creation server 30 receives the information relating to the job flow expressing the cooperation of the respective services from the client terminal 10. The script creation server 30 acquires the I/F information from the respective service processing devices performing the cooperative processing on the basis of <Service Location Information> described in the service list. Then, on the basis of the information relating to the job flow and the I/F information, the script creation server creates the script which defines the contents of processings requested to the respective services, input parameters, the way of cooperation of the respective services, and information for specifying the document as the processing object, such as the document name and storage location information, and ends the script creation processing. Finally, the script creation server 30 transmits the script of the XML format to the script management server 40.

The script management server 40 stores the script created by the script creation server 30. The script management server 40 stores plural scripts created by the script creation server 30, and reads out a selected script when a selection instruction of a script is issued from the client terminal 10.

Incidentally, instead of returning to the step ST2 when a negative judgment is made at the step ST5, the script management server 40 always stores the service list acquired at the step ST2, and when the negative judgment is made at the step ST5, the script management server may return to the step ST3.

(Invocation and Execution of Cooperative Processing)

Figure 12:
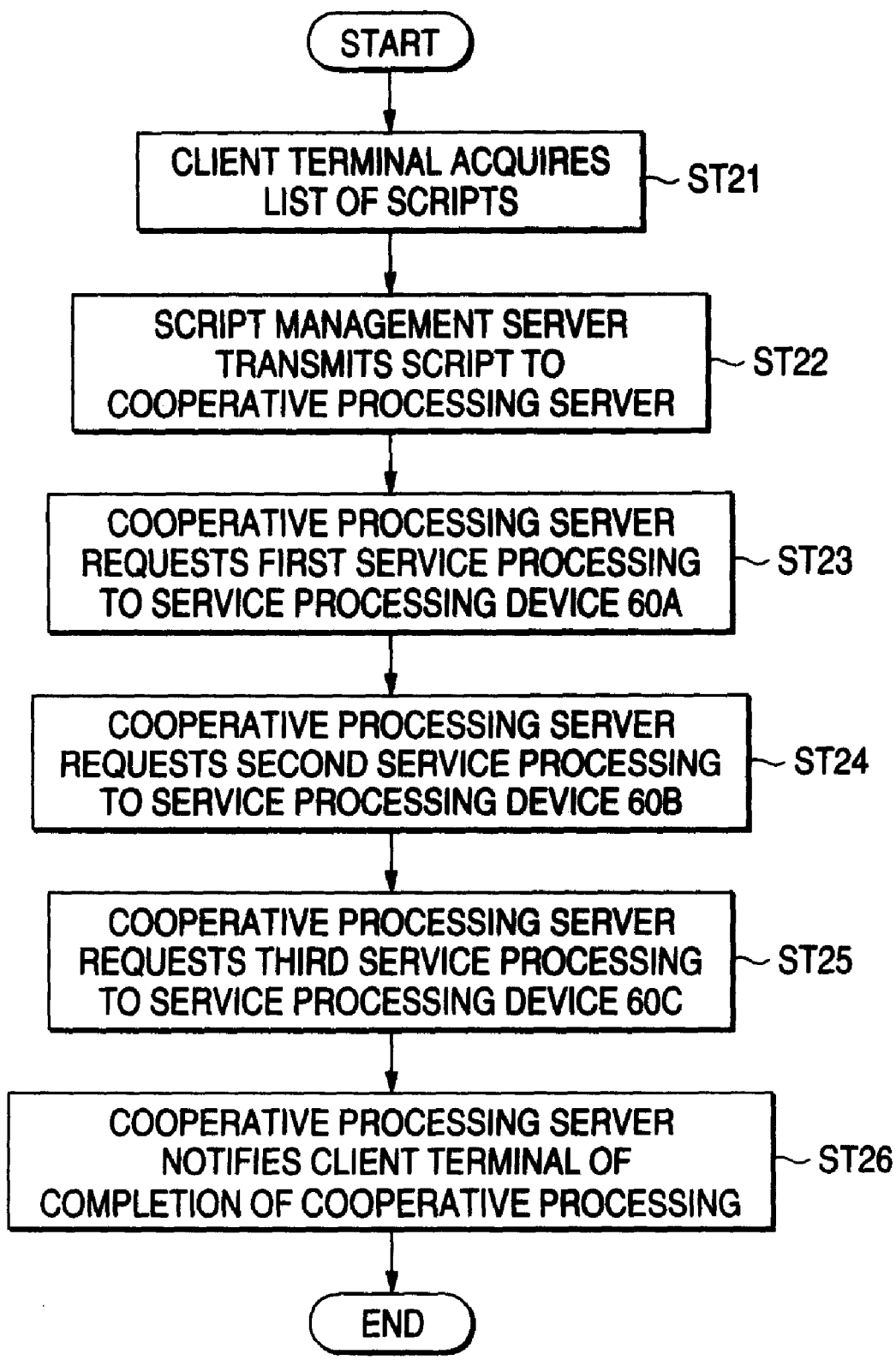
FIG. 12 is a flowchart showing the processing of a client terminal, a script management server and a cooperative processing server.

The user selects a desired script among the plural scripts stored in the script management server 40, and can invoke the cooperative processing. Specifically, this is as follows:

FIG. 12 is a flowchart showing the processing of the client terminal 10, the script management server 40 and the cooperative processing server 50.

At step ST21, the client terminal 10 accesses the script management server 40 and acquires the script list managed by the script management server 40.

Figure 13:
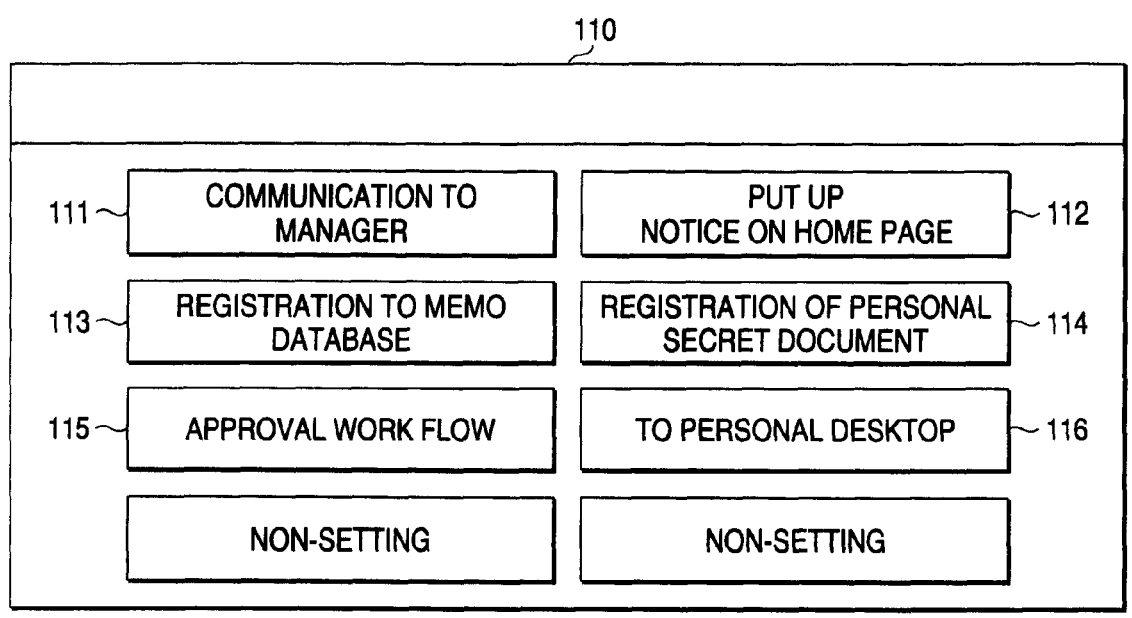
FIG. 13 is a view showing an example of a service cooperative processing selection screen expressing a script list.

FIG. 13 is a view showing an example of a service cooperative processing selection screen 110 expressing the script list. The service cooperative processing selection screen 110 has buttons 111 to 116 for selecting scripts for the respective scripts. The user can select the script by clicking a desired button from the service cooperative processing selection screen 110.

The client terminal 10 selects the script expressing the specific service cooperative processing from the service cooperative processing selection screen 110 on the basis of the operation instruction of the user, and at this time, as the need arises, the client terminal displays the parameter input screen for the user, and receives the input of parameters necessary for the execution of the job flow. When instructing the invocation of the script, the client terminal proceeds to step ST22.

At the step ST22, the script management server 40 transmits the script indicated by the client terminal 10 to the cooperative processing server 50 and proceeds to step ST23. As a result, the cooperative processing server 50 starts the execution of the cooperative processing.

At the step ST23, the cooperative processing server 50 interprets the script transmitted from the script management server 40, and requests, for example, the service processing device 60A as the first processing described in the script to execute the first service.

Specifically, the cooperative processing server 50 extracts the location of the service processing device to which the processing request is made, the input parameter and output parameter format necessary for the processing request, the method name for the processing request, the invocation scheme, and the information for specifying the processing object document on the basis of the information described in the script, and creates individual instruction information. The cooperative processing server 50 transmits the individual instruction information to the service processing device 60A as the first service processing request destination.

The service processing device 60A copies the processing object document and acquires the document on the basis of the location information of the storage destination of the processing object document described in the transmitted script. The service processing device 60A interprets the contents of the service request and executes the service A on the acquired document image. The service processing device 60A again stores the document obtained by the service A into the original storage destination. When the processing as stated above is completed, the service processing device 60A transmits the processing result, such as the status information (completion) of the processing, output parameters, and document storage destination information after the processing, to the cooperative processing server 50, and proceeds to step ST24.

At the step ST24, when receiving the processing result from the service processing device 60A, the cooperative processing server 50 manages the result of the first processing request as a log. Then, the cooperative processing server 50 specifies a second processing request destination on the basis of the script, and requests the service processing device 60B to execute a second service. Similarly to the first service processing request, the cooperative processing server 50 transmits individual instruction information (information to store the document as information relating to the processing request, information of the storage destination of the document, and information to specify the processing object document) to the service processing device 60B.

On the basis of the contents of the request of the cooperative processing server 50, the service processing device 60B executes, on the basis of the request contents, the service B on the document processed and stored in the former processing (first service). When the processing as stated above is completed, the service processing device 60B transmits the processing result, such as the status information (completion) of the processing, output parameters, and document storage destination information after the processing, to the cooperative processing server 50 and proceeds to step ST25.

At the step ST25, when receiving the processing result of the second service (service processing device 60B), the cooperative processing server 50 manages the result of the second processing request as a log. The cooperative processing server 50 specifies a third processing request destination on the basis of the script, and requests the service processing device 60C to execute a third service. Similarly to the second service request, the cooperative processing server 50 transmits individual instruction information (information to store the document as information relating to the processing request, information of the storage destination of the document, and information to specify the processing object document) to the service processing device 60C.

On the basis of the contents of the request of the cooperative processing server 50, with respect to the document processed and stored in the former processing (second service), the service processing device 60C reads out the document file on the basis of the information (storage destination information) to specify the document, and executes the service C described in the contents of the request. When the processing is completed, the service processing device 60C transmits the processing result, such as the status information (completion) of the processing, output parameters, and document storage destination information after the processing, to the cooperative processing server 50 and proceeds to step ST26.

At the step ST26, the cooperative processing server 50 receives the processing result from the third service (service processing device 60C), and when judging that a next processing is not described in the script, the cooperative processing server notifies the client terminal 10 that all processings are completed, and ends the cooperative processing.

Incidentally, it is a matter of course that when the cooperative processing is executed in accordance with the script, the cooperative processing server 50 rewrites the user information, and the restriction value tables of the respective service processing devices 60 as the need arises.

As described above, the script creation server 30 of this embodiment causes the service retrieval server 20 to retrieve the services available to the user, and creates the script for instructing the cooperation execution of the plural services by using the respective services retrieved by the service retrieval server 20. Accordingly, even in the case where the service processing device 60 sets the use restriction of the user, the script creation server 30 can create the script which is not influenced by the use restriction.

Then, the cooperative processing server 50 executes the cooperative processing by using the script created by the script creation server 30, so that the execution request of the service is not made to the service processing device 60 which sets the use restriction of the user, and therefore, the cooperative processing can be certainly executed.

Second Embodiment

Next, a second embodiment of the invention will be described. Incidentally, the same parts as those of the first embodiment are denoted by the same reference numerals and the detailed description will be omitted. In this embodiment, the script creation server 30 directly inquires of the respective service processing devices 60 as to whether a certain user can use them, and creates a script on the basis of the inquiry result.

(Script Creation)

Figure 14:
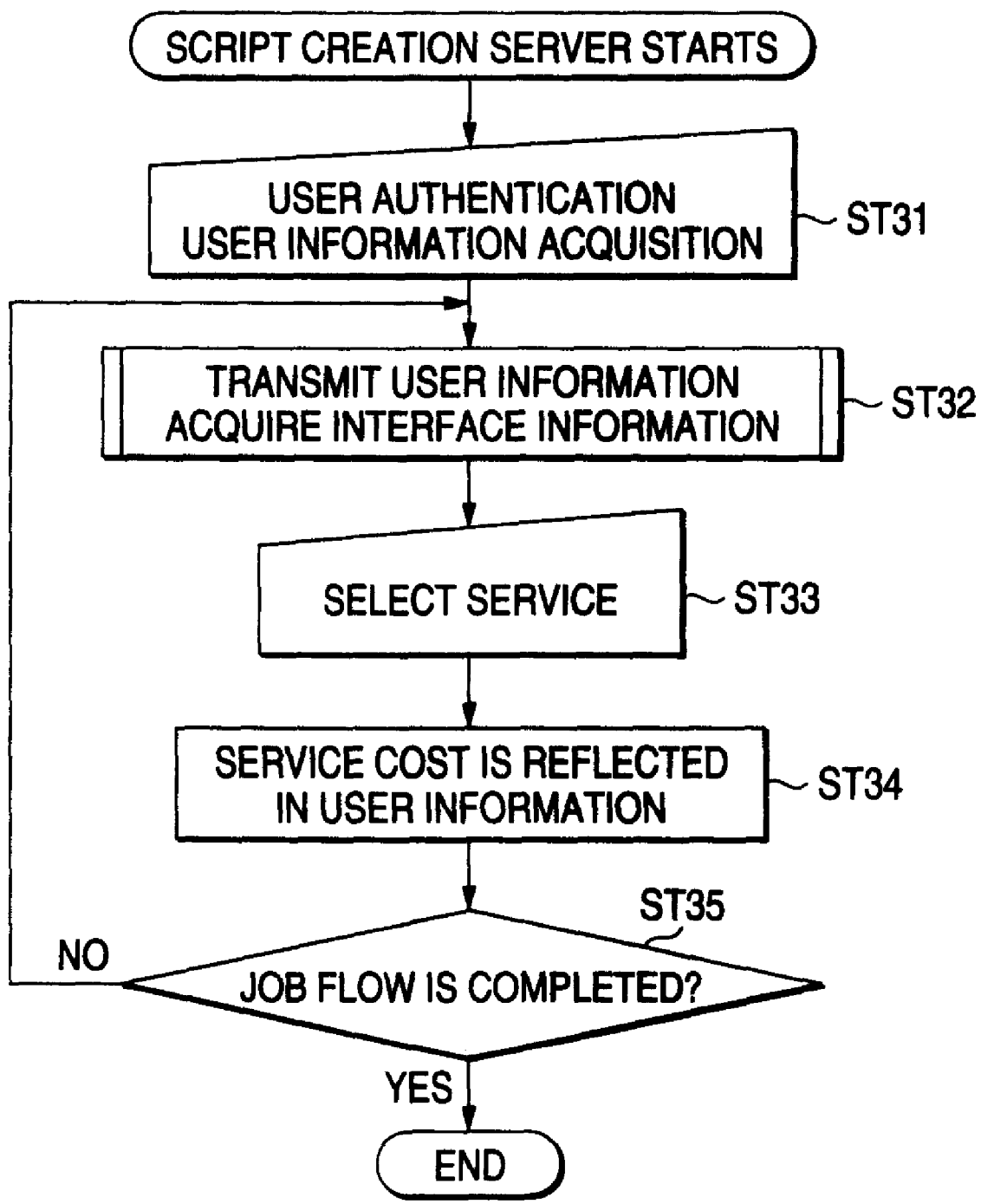
FIG. 14 is a flowchart showing the processing procedure of a script creation server at the time of script creation according to a second embodiment.

FIG. 14 is a flowchart showing a processing procedure of the script creation server 30 at the time of creation of a script. When confirming the access of the client terminal 10, the script creation server 30 executes processings from step ST31 to step ST35. Incidentally, the step ST31, and the step ST33 to the step ST35 are respectively the same as the step ST1 and the step ST3 to the step ST5. Then, the step ST32 will be mainly described.

At the step ST32, the script creation server 30 transmits the user information of the user to the respective service processing devices 60, and inquires as to whether the user can use the services. Then, on the basis of the inquiry result on the respective service processing devices 60, the script creation server 30 creates a service list expressing the services available to the user, and proceeds to step ST33.

At this time, the service processing device 60 executes a processing in accordance with the following procedure in response to the inquiry from the script creation server 30.

(Processing of the Service Processing Device 60)

Figure 15:
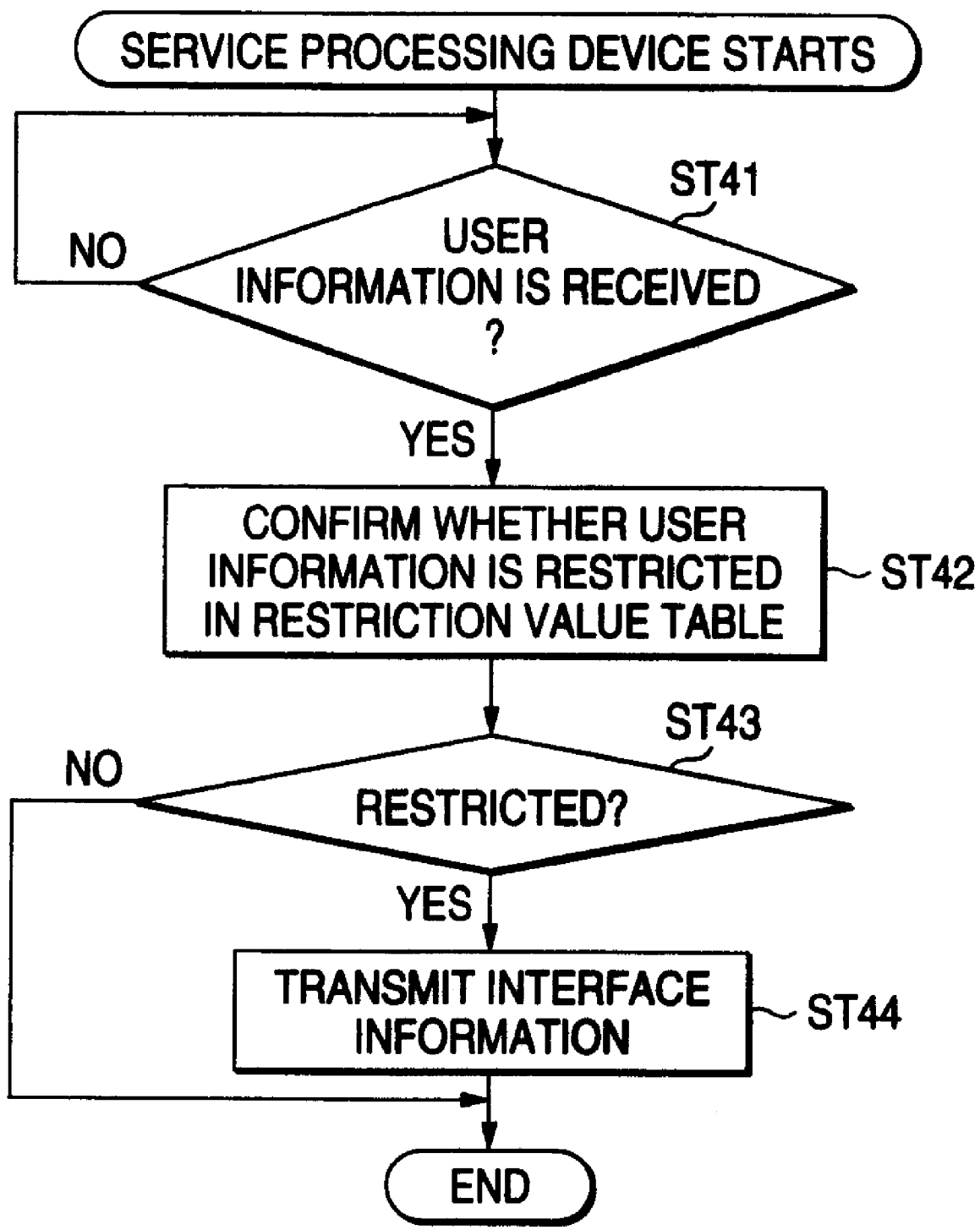
FIG. 15 is a flowchart for explaining the retrieval processing procedure of a service processing device.

FIG. 15 is a flowchart for explaining a retrieval processing procedure of the service processing device 60. When the script creation server 30 inquires as to whether the service can be used, the service processing device 60 executes processings subsequent to step ST41.

At the step ST41, the service processing device 60 judges whether the user information is received, and stands by until the user information is received, and when receiving the user information, the service processing device proceeds to step ST42.

At the step ST42, the service processing device 60 compares the user information with the previously stored restriction value table, and confirms whether the user information is restricted by the restriction value table, and proceeds to step ST43. That is, the service processing device 60 confirms acceptance or rejection of use of the user about whom the script creation server 30 inquires.

At the step ST43 and step ST44, on the basis of the confirmation result at the step ST43, when judging that the use of the user is not restricted, the service processing device 60 transmits I/F information to the script creation server 30, and when judging that the use of the user is restricted, the service processing device ends the processing directly.

On the other hand, the script creation server 30 acquires the I/F information transmitted from the respective service processing devices 60, creates the service list expressing the services available to the user, and executes the processings subsequent to the step ST33.

As described above, the script creation server 30 of this embodiment directly inquires of the service processing devices 60 as to whether the user can use them, and acquires the I/F information from the service processing devices 60 which the user can use, and accordingly, even in the case where the service processing device 60 sets the use restriction of the user, the script creation server can create the script which is not influenced by the use restriction.

Third Embodiment

Next, another embodiment of the invention will be described. Incidentally, the same parts as those of the above embodiment are denoted by the same reference numerals and the detailed description will be omitted.

After a functional job flow is created by a user, the script creation server 30 of a third embodiment checks use restriction of services constituting the job flow.

Figure 16:
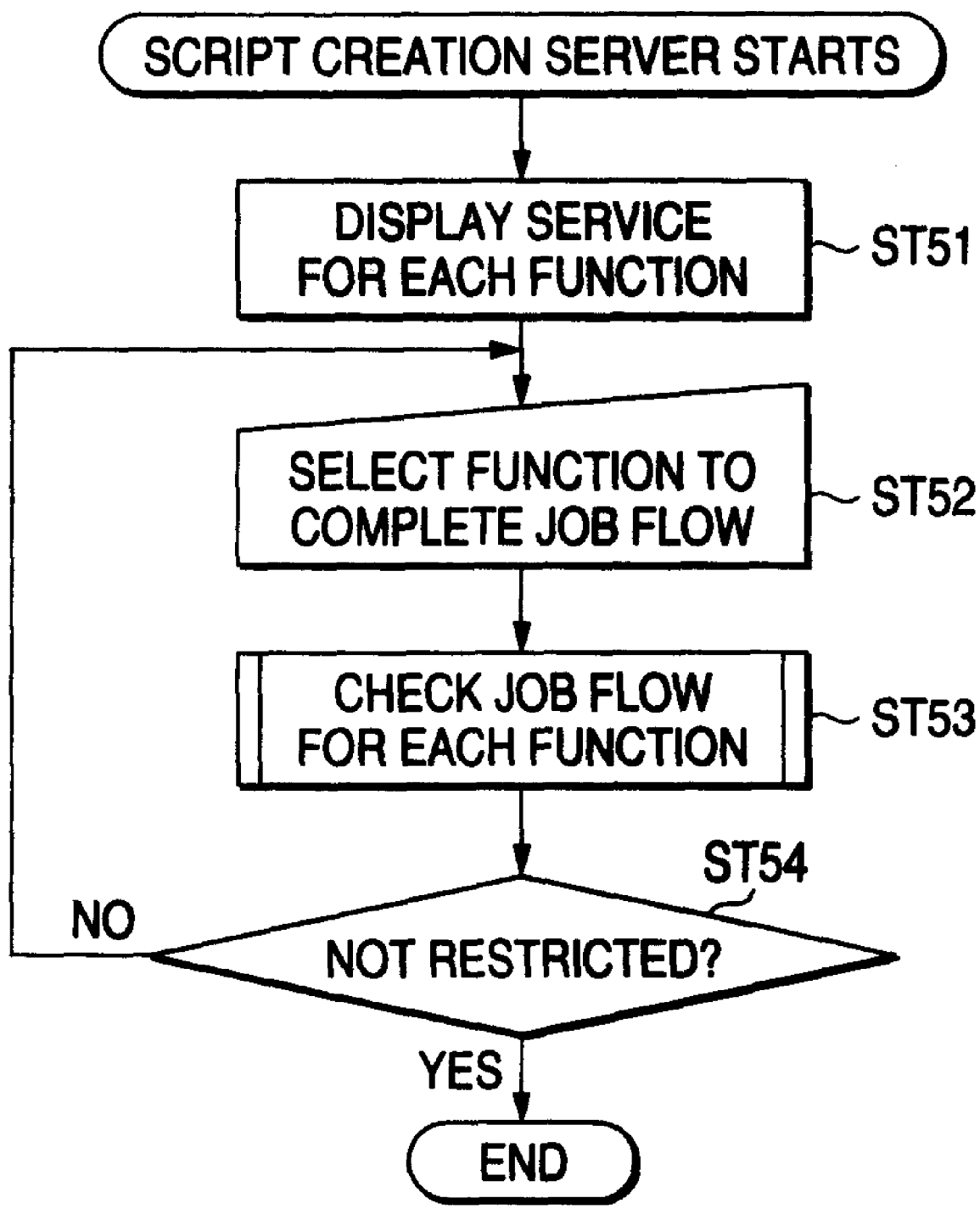
FIG. 16 is a flowchart showing the processing procedure of a script creation server at the time of script creation according to a third embodiment.

FIG. 16 is a flowchart showing a processing procedure of the script creation server 30 at the time of creation of a script.

(Main Routine 1)

At step ST51, the script creation server 30 requests the service retrieval server 20 to retrieve services for each function. The script creation server 30 receives from the service retrieval server 20 a service list in which plural services are classified by each function. On the basis of the received service list, the script creation server 30 transmits to the client terminal 10 a script creation screen in which the plural services are classified by each function and displayed, and proceeds to step ST52.

Figure 17:
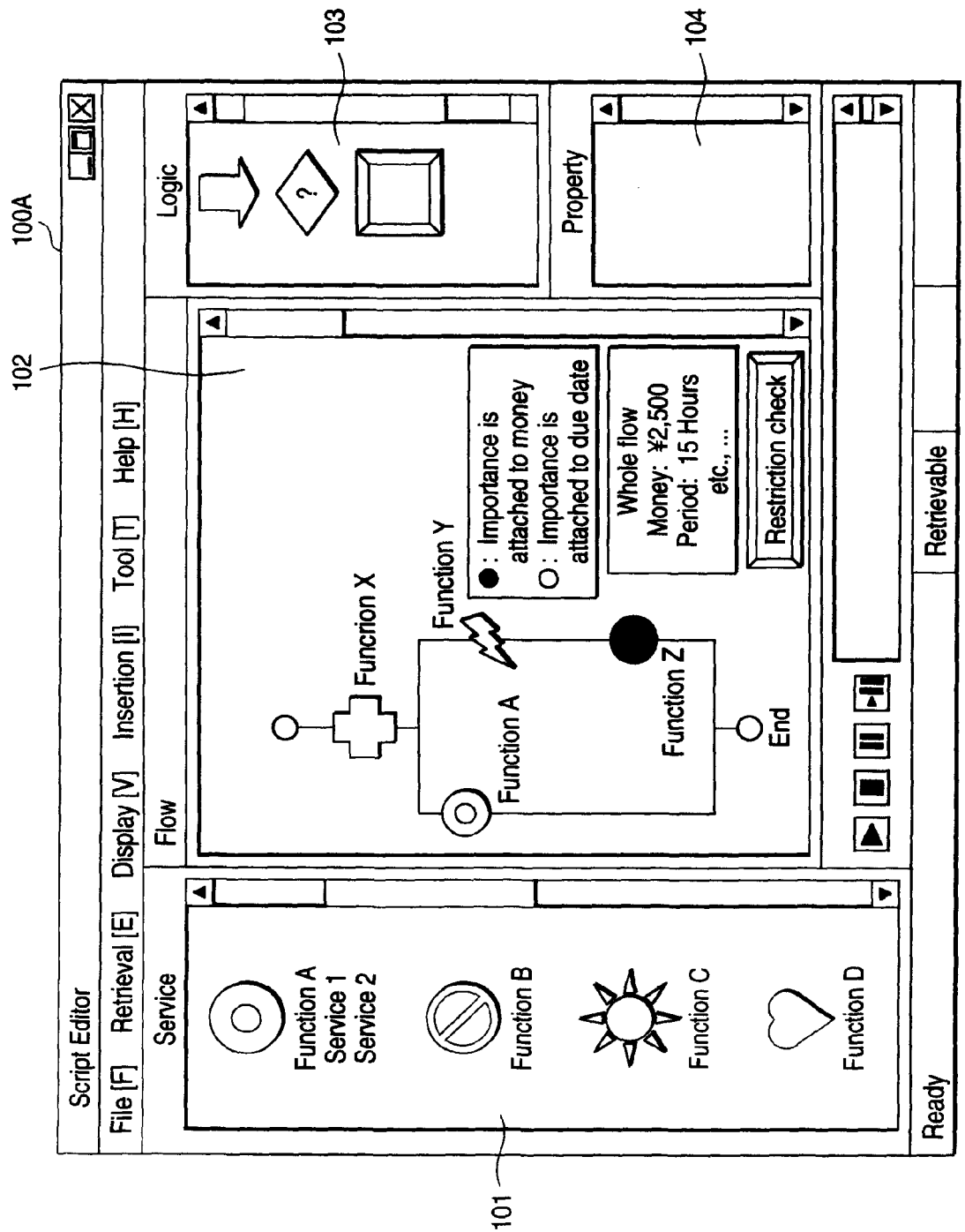
FIG. 17 is a view showing a script creation screen displayed on a client terminal.

FIG. 17 is a view showing a script creation screen 100A displayed on the client terminal 10. Functions A, B, C and D are displayed on the service window 101. As services contained in the function A, there are service 1 and service 2. Incidentally, although services contained in the functions B, C and D exist respectively, the illustration is omitted.

The user can define the job flow expressing cooperation of functions on the flow window 102 by dragging and dropping functional icons of the service window 101 and logic icons of the logic window 103 to the flow window 102.

Incidentally, the user can set the function, service and logic in detail by editing the contents displayed on the property window 104. For example, the user may set the priority order of services among specific functions. Besides, the user may select not only a function but also a specified service.

At the step ST52, when judging that the respective functions are selected through the script creation screen 100A of the client terminal 10 and the job flow is completed, the script creation server 30 proceeds to step ST53.

Incidentally, in the case where the job flow is completed, the restriction information of the whole flow, for example, the cost ("money: ¥2,500 yen" in FIG. 17) required to execute the whole job flow and the period ("period: 15 hours" in FIG. 17) are displayed on the flow window 102 of the script creation screen 100A.

At the step ST53, when judging that the restriction check button 105 of the script creation screen 100A is clicked, the script creation server 30 checks the job flow displayed on the flow window 102 for each function.

(Subroutine)

Figure 18:
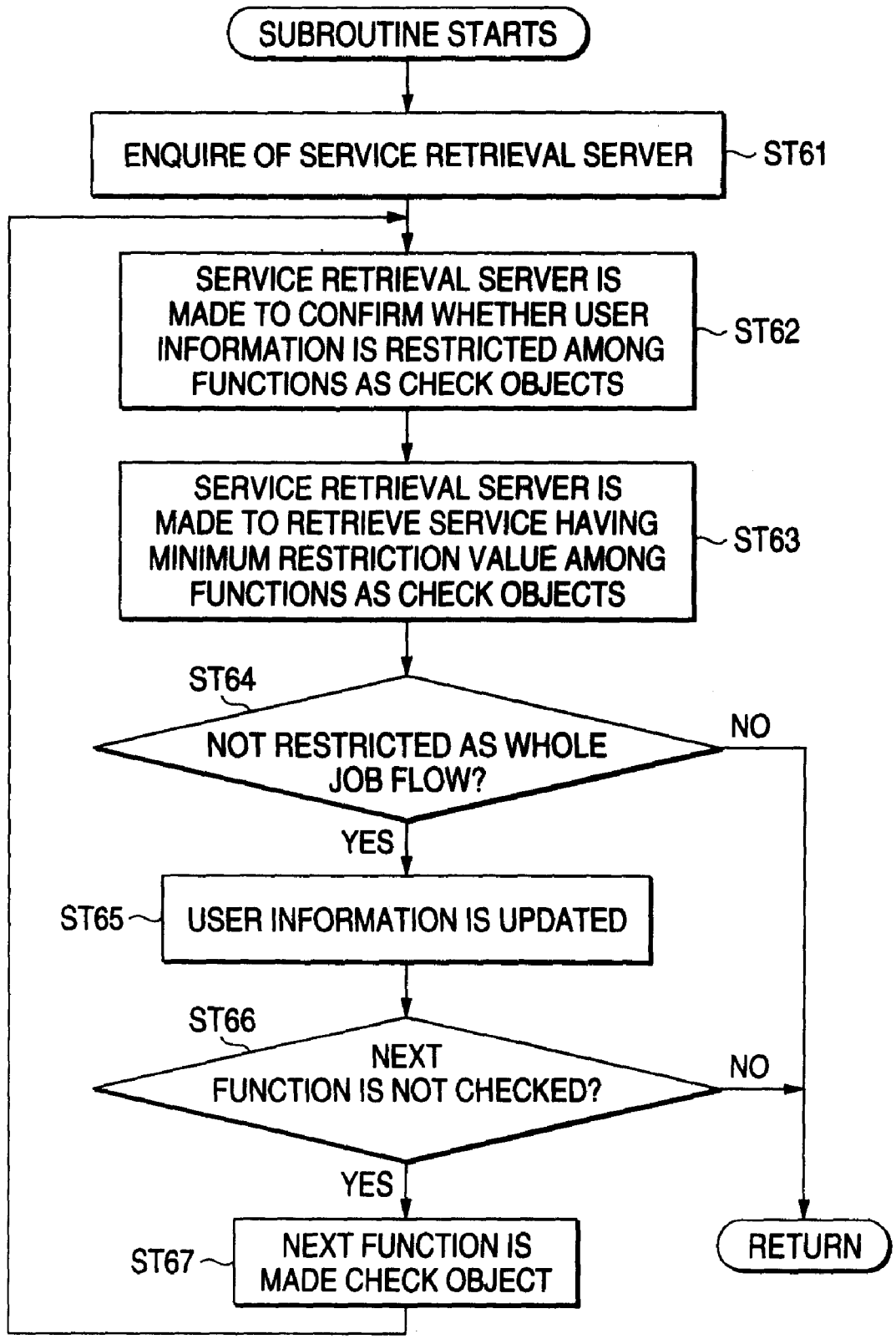
FIG. 18 is a flowchart showing a subroutine at the time when a script creation server checks respective functions constituting a job flow.

FIG. 18 is a flowchart showing a subroutine at the time when the script creation server 30 checks the respective functions constituting the job flow. When judging that the restriction check button 105 is clicked, the script creation server 30 executes processings subsequent to step ST61.

At the step ST61, the script creation server 30 inquires of the service retrieval server 20 about the user information, and proceeds to step ST62. Incidentally, the user information may be information inputted from the client terminal 10 at the time of user authentication.

At the step ST62, the script creation server 30 causes the service retrieval server 20 to confirm whether the user information is restricted in the function as the check object, and proceeds to step ST63.

At this time, the service retrieval server 20 checks the restriction value tables of the respective services against the user information in the function as the check object, and retrieves the services in which the user's use is not restricted.

At the step ST63, the script creation server 30 causes the service retrieval server 20 to retrieve a service having the lowest restriction value in the function as the check object, and proceeds to step ST64.

At this time, the service retrieval server 20 retrieves the service having the lowest restriction value among the services in which the user's use is not restricted, and transmits the retrieval result to the script creation server 30. As the way of retrieving the service having the lowest restriction value, for example, in the case where importance is attached to the service execution money, the service retrieval server 20 has only to retrieve the service having the lowest service execution money. Besides, for example, in the case where importance is attached to the service execution time, the service retrieval server 20 has only to retrieve the service having the shortest service execution time.

At the step ST64, the script creation server 30 confirms whether the processing as the whole flowchart is restricted in the case where the function as the check object is replaced with the service retrieved by the script creation server 30. For example, in the case where "funds" of the user information exceeds "money" of the whole job flow, or "desired due date" of the user information exceeds "period" of the whole job flow, the processing of the whole job flow is restricted.

When the processing as the whole job flow is not restricted, the script creation server 30 sets the service retrieved by the service retrieval server 20 as the service constituting the job flow, and proceeds to step ST65. On the other hand, when the processing as the whole job flow is restricted, the script creation server leaves the subroutine.

At the step ST65, the script creation server 30 causes the user information to reflect the restriction placed on the execution of the job flow, and updates the user information. For example, the script creation server subtracts the money or period required to execute the job flow from the user information, and proceeds to step ST66.

At the step ST66, the script creation server 30 judges whether there is a next function which is not checked in the job flow, and when there is a next function which is not checked, the script creation server proceeds to step ST67, and when there is no such a function, it leaves the subroutine.

At the step ST67, the script creation server 30 sets the next function to be the function as the check object and returns to the step ST62. Then, the script creation server 30 can set the services, which are not restricted by the user information, for the respective functions of the job flow by repeatedly executing the processings from the step ST62 to the step ST67.

(Main routine 2)

When executing the subroutine of the step ST53, the script creation server 30 proceeds to step ST54.

At the step ST54, the script creation server 30 judges whether the job flow checked at the step ST53 is restricted, and returns to the step ST52 when the job flow is restricted. At this time, the script creation server 30 transmits a script creation screen 100A specifying a restricted function (for example, "function Z" in FIG. 17) to the client terminal 10. By this, the script creation server 30 urges the user to change the function (or service) constituting the job flow.

On the other hand, when the job flow is not restricted, the script creation server 30 receives information relating to the job flow expressing the cooperation of the respective services from the client terminal 10, and acquires I/F information from the respective service processing devices performing the cooperative processing. Then, on the basis of the information relating to the job flow and the I/F information, the script creation server creates the script defining the contents of the processing requested to the respective services, input parameters, the way of cooperation of the respective services, and information for specifying a document as a processing object, such as a document name and storage location information, and ends the script creation processing. Finally, the script creation server 30 transmits the script of the XML format to the script management server 40.

As described above, after the user defines the job flow of only the functions, the script creation server 30 of the third embodiment causes the service retrieval server 20 to retrieve the service in which the user's use is not restricted and which has the lowest restriction value for each of the functions. Then, the script creation server 30 sets the service retrieved by the service retrieval server 20 and having the lowest restriction value into the job flow. As a result, after the user freely creates the job flow, the script creation server 30 can create the script for making the respective services cooperate with each other by using the services in which the user's use is not restricted and which have the lowest restriction values.

Besides, when executing the cooperative processing by using the script created by the script creation server 30, the cooperative processing server 50 does not make a service execution request to the service processing device 60 which sets the use restriction of the user, so that the cooperative processing can be certainly executed. Further, since the cooperative processing of the services having the lowest restriction values is executed, the cost, such as a fee and a time, can be greatly suppressed.

Fourth Embodiment

Next, a fourth embodiment of the invention will be described. Incidentally, the same parts as those of the third embodiment are denoted by the same reference numerals and the detailed description will be omitted.

In this embodiment, the script creation server 30 directly inquires of the respective service processing devices 60 as to whether a certain user can use them, and creates a script on the basis of the result of the inquiry. When compared with the third embodiment, only the subroutine of the step ST53 shown in FIG. 16 is different.

Figure 19:
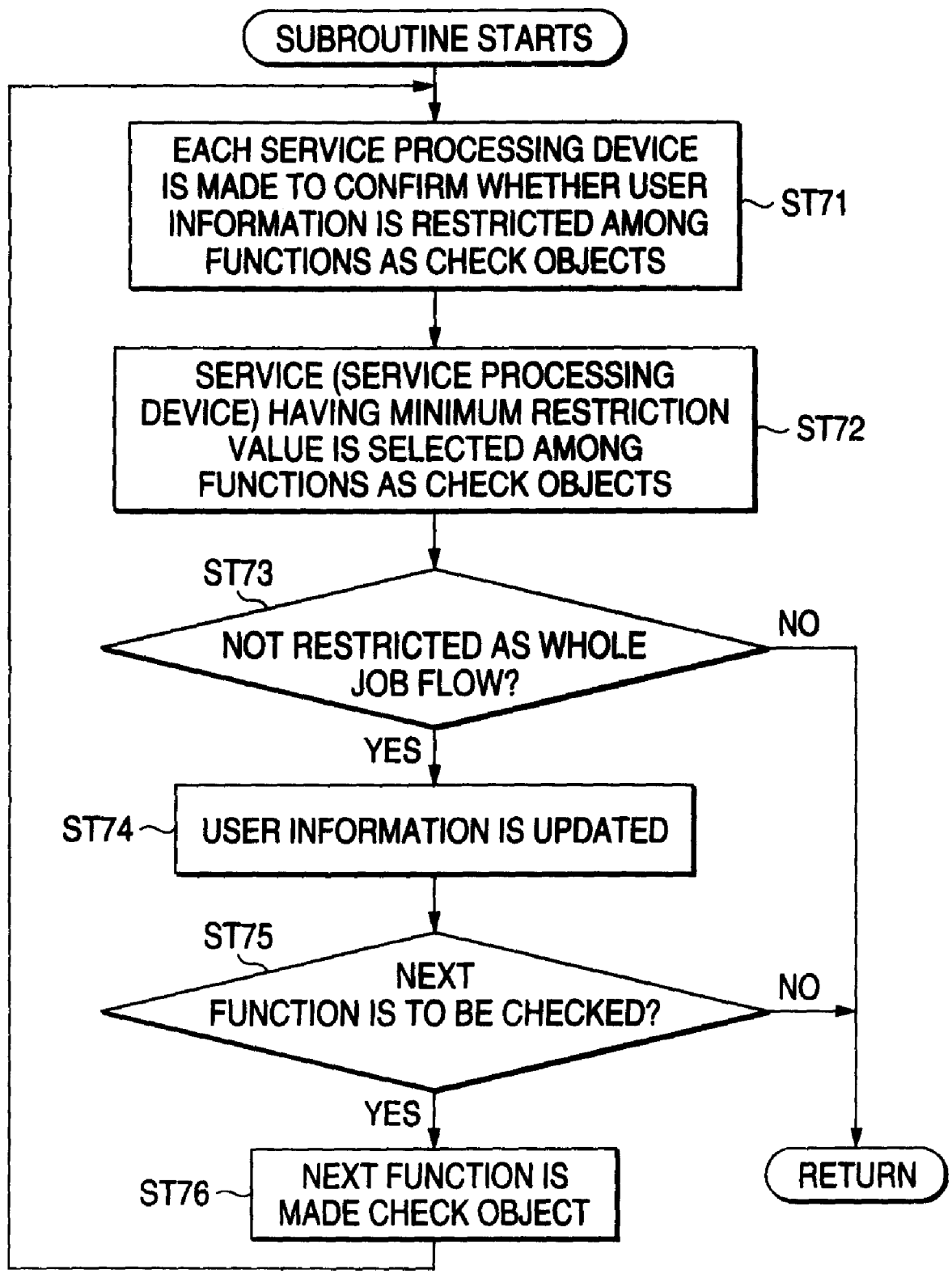
FIG. 19 is a flowchart showing a subroutine at the time when a script creation server checks respective functions constituting a job flow according to a fourth embodiment.

FIG. 19 is a flowchart showing a subroutine at the time when the script creation server 30 checks the respective functions constituting the job flow at the step ST53. When judging that the restriction check button 105 is clicked, the script creation server 30 executes processings subsequent to step ST71. Incidentally, step ST73 to step ST76 are the same as the step ST64 to the step ST67 explained in the third embodiment. Thus, the step ST71 and step ST72 will be mainly described.

At the step ST71, the script creation server 30 causes the respective service processing devices 60 to confirm whether user information is restricted with respect to a function as a check object, and proceeds to the step ST72.

At this time, the service processing device 60 checks the user information transmitted from the script creation server 30 against the restriction value table previously stored by itself, confirms whether the use of the user is restricted, and transmits the confirmation result to the script creation server 30.

At the step ST72, the script creation server 30 selects a service (service processing device 60) in which the user's use is not restricted and which has the lowest restriction value among functions as check objects, and proceeds to the step ST73. Then, similarly to the third embodiment, the script creation server 30 executes processings from the step ST73 to the step ST76.

As described above, after the user defines the job flow of only the functions, the script creation server 30 of the fourth embodiment inquires of the respective service processing devices 60 with respect to each of the functions, and finds out the service in which the user's use is not restricted and which has the lowest restriction value. Then, the script creation server 30 sets the service having the lowest restriction value among the found services into the job flow.

As a result, after the user freely creates the job flow, the script creation server 30 can create the script for making the respective services cooperate with each other by using the services in which the user's use is not restricted and which have the lowest restriction values.

Besides, when executing the cooperative processing by using the script created by the script creation server 30, the cooperative processing server 50 does not make a service execution request to the service processing device 60 setting the use restriction of the user, so that the cooperative processing can be certainly executed. Further, since the cooperative processing of the services having the lowest restriction values is executed, the cost, such as a fee and a time, can be greatly suppressed.

Fifth Embodiment

Next, a fifth embodiment of the invention will be described. Incidentally, the same parts as those of the above embodiment are denoted by the same reference numerals and the detailed description will be omitted.

Figure 20:
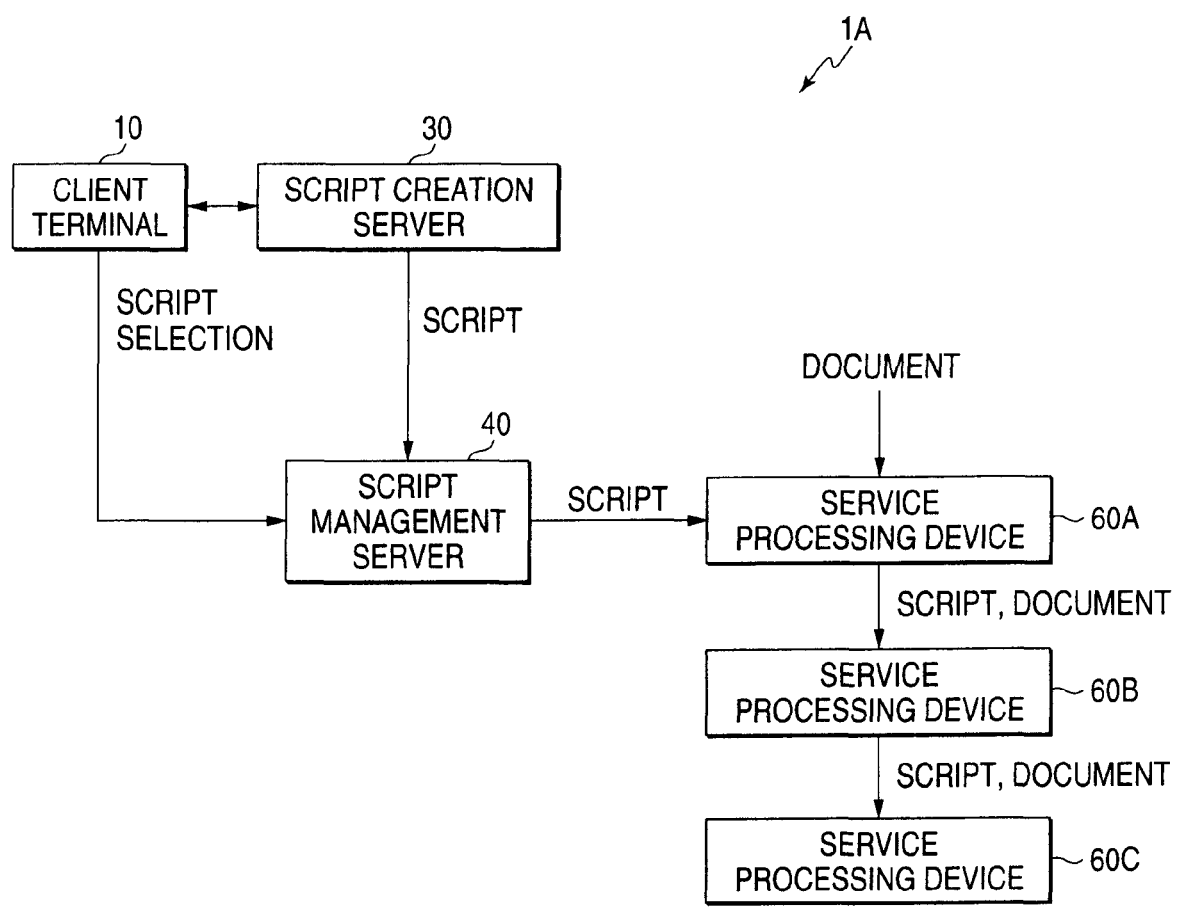
FIG. 20 is a block diagram showing the mutual relation of respective service processing devices constituting a document processing system according to a fifth embodiment.

FIG. 20 is a block diagram for explaining the mutual relation among respective service processing devices constituting a document processing system 1A according to the fifth embodiment.

The document processing system 1A executes the cooperative processing of plural services without using the cooperative processing server 50 shown in FIGS. 1 and 2. Incidentally, the script creation server 30 may be any one of the first to the fourth embodiments.

Incidentally, although FIG. 20 shows only main service processing devices relating to the cooperative processing, the other service processing devices (except for the cooperative processing server 50) shown in FIG. 1 may be included.

(Invocation and Execution of Cooperative Processing)

A user selects a desired script among plural scripts stored in a script management server 40 and can invoke a cooperative processing. Specifically, this is as follows.

A client terminal 10 selects the script expressing the desired service cooperative processing from a service cooperative processing selection screen in accordance with the operation of the user, and instructs the invocation of the script. The script management server 40 transmits the script indicated by the client terminal 10 to a service processing device 60A.

The service processing device 60A acquires a document as a processing object on the basis of storage destination location information of the processing object document described in the transmitted script. The service processing device 60A executes a service A on the acquired document image. After executing the service A, the service processing device 60A deletes the service request described in the script. Then, the service processing device 60A transmits the document obtained by the service A and the script including the processing result such as the status information (completion) of the processing, output parameters, and document storage destination information after the processing, to a service processing device 60B for executing a next service.

The service processing device 60B executes a service B on the document transmitted from the service processing device 60A on the basis of the script. Then, the service processing device 60B deletes the service request described in the script, and transmits the document and the script to a service processing device 60C for performing a next service.

The service processing device 60C executes the service C on the document transmitted from the service processing device 60B on the basis of the script. When judging that a next service is not described in the script, the service processing device 60C notifies the client terminal 10 that all processings are completed, and ends the cooperative processing.

Incidentally, the invention is not limited to the foregoing embodiments, but can be applied even to a case where a design matter is modified as long as the modification is within the scope of the matter recited in the claims.

For example, in the foregoing embodiments, although the service retrieval server 20 and the script creation server 30 are independently configured, these functions may be integrated into one. Besides, although the description has been made such that the client terminal 10 and the script creation server 30 are independent from each other, these may be integrated into one.

Incidentally, in the service processing device 60, the object of restriction by the restriction value table may be confined to a specific user or users of a specific group, not all users.

Further, the user information is not limited to that shown in FIG. 9, but may be such as expresses attributes of a user. For example, a service may be provided to only users in a specific area by restricting an address or the like.

Besides, the service retrieval server 20 manages the restriction value tables of the respective service processing devices 60 in a unified way and retrieves services. However, an authentication server for managing the restriction value tables in a unified way and a service retrieval server for performing only retrieval of services may be provided instead of the service retrieval server 20. At this time, check of the restriction value tables may be performed by the service retrieval server or the authentication server.

The cooperation instruction information creation device of the invention uses the user information to acquire plural services available to the user, and uses the plural acquired services to create the cooperation instruction information, so that the cooperation instruction information for smoothly executing the cooperative processing of the plural services can be created without being subjected to the restriction of the service.

According to the cooperation instruction information creation method of the invention, plural services available to the user are acquired by checking the restriction value tables expressing execution restriction of the respective services against the user information, and the cooperation instruction information is created by using the plural acquired services, so that the cooperation instruction information for smoothly executing the cooperative processing of the plural services can be created without being subjected to the restriction of the service.

The entire disclosure of Japanese Patent Application No. 2003-078974 filed on Mar. 20, 2003 including specification, claims, drawings and abstract is incorporated herein by reference in its entirety.

What is claimed is:

1. A cooperation instruction information creation device for creating cooperation instruction information to instruct cooperation of plural services on a network, comprising:

a service acquisition unit that acquires plural services for a document available to a user for each function constituting a job flow by using updated user information, wherein the user information is updated when at least one of the plural services is selected to constitute the job flow without execution of the at least one selected service of the plural services before the completion of the job flow, and the plural services available to the user being determined by content of a restriction value table expressing restrictions on execution of services for the document and values of the updated user information are checked against values of the restriction value table before a next selection of a service until an end of the job flow;

a cooperation instruction information creation unit that creates the cooperation instruction information by using the plural services for the document acquired by the service acquisition unit; and a display unit that displays a service list, the service list including a list of the plural services for the document available to the user which the user can use at present, wherein each of the plural services for the document performs specific processing on data related to the document, the service acquisition unit acquires at least one of the plural services for the document available to the user for each of functions constituting a job flow for the document that is created and the cooperation instruction information creation unit provides for selection of at least one of the plural services for the document available to the user corresponding to each of the functions, and the plural services for the document available to the user and the user information are updated with each selection.

2. The cooperation instruction information creation device according to claim 1, further comprising:

an inquiry unit that inquires of respective service processing devices for the document each storing a restriction value table expressing restrictions on execution of services for the document by transmitting user information, as to whether the user can use the services for the document of the respective service processing devices, wherein the service acquisition unit acquires the plural services for the document on the basis of an inquiry result of the inquiry unit.

3. The cooperation instruction information creation device according to claim 1, wherein the service acquisition unit determines and acquires a service for the document having minimum restrictions for each of the functions constituting the job flow for the document, and the cooperation instruction information creation unit creates the cooperation instruction information by associating the respective plural services for the document acquired by the service acquisition unit with the respective functions constituting the job flow for the document.

4. A cooperation instruction information creation method for creating cooperation instruction information to instruct cooperation of plural services for a document on a network, comprising the steps of:

acquiring plural services for a document available to a user for each function constituting a job flow by checking updated user information against respective restriction value tables expressing restrictions on execution of the respective plural services for the document, wherein the user information is updated when at least one of the plural services for the document is selected to constitute the job flow without execution of the at least one selected service of the plural services before the completion of the job flow, and the plural services for the document available to the user being determined by content of the respective restriction value tables and values of the updated user information are checked against values of the respective restriction value tables before a next selection of a service until an end of the job flow;

creating cooperation instruction information by using the acquired plural services for the document; and displaying a service list, the service list including a list of the plural services for the document available to the user which the user can use at present, wherein each of the plural services for the document performs a specific processing on data related to the document, at least one of the plural services for the document available to the user are acquired for each of functions constituting a job flow for the document that is created and the cooperation instruction information is created based on a selection of at least one of the plural services for the document available to the user corresponding to each of the functions, and the plural services for the document available to the user and the user information are updated with each selection.

5. The cooperation instruction information creation method according to claim 4, wherein in the cooperation instruction information creation step, services constituting the job flow for the document are selected from the acquired plural services for the document, and the cooperation instruction information is created by using the selected services for the document.

6. The cooperation instruction information creation method according to claim 4, wherein in the plural services acquisition step, a service for the document having minimum restrictions is determined and acquired for each of the functions constituting the job flow for the document.

* * * * *